United States Patent
Wu

(10) Patent No.: US 9,639,120 B2
(45) Date of Patent: May 2, 2017

(54) HEAT DISSIPATION STRUCTURE OF WEARABLE ELECTRONIC DEVICE

(71) Applicant: ASIA VITAL COMPONENTS CO., LTD., New Taipei (TW)

(72) Inventor: Chun-Ming Wu, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 179 days.

(21) Appl. No.: 14/571,299

(22) Filed: Dec. 16, 2014

(65) Prior Publication Data

US 2016/0135328 A1    May 12, 2016

(30) Foreign Application Priority Data

Nov. 10, 2014    (TW) ................. 103138957

(51) Int. Cl.
*G06F 1/16*   (2006.01)
*G06F 1/20*   (2006.01)

(52) U.S. Cl.
CPC ............ *G06F 1/1643* (2013.01); *G06F 1/163* (2013.01); *G06F 1/203* (2013.01)

(58) Field of Classification Search
CPC ...... G06F 1/1643; G06F 1/1635; G06F 1/163; G06F 1/20; G06F 1/203; H05K 7/2039; H04M 1/04
USPC ............ 361/679.01, 679.03, 679.46, 679.52, 361/679.53, 679.54, 704, 709, 710; 165/80.2, 80.4, 104.26, 104.33
See application file for complete search history.

(56) References Cited

U.S. PATENT DOCUMENTS

| | | | |
|---|---|---|---|
| 6,282,089 B1* | 8/2001 | Nakanishi | G06F 1/163 361/679.47 |
| 6,304,520 B1* | 10/2001 | Watanabe | G04B 37/0008 368/203 |
| 9,367,105 B1* | 6/2016 | Shen | G06F 1/203 |
| 2002/0186535 A1* | 12/2002 | Smith | D03D 15/00 361/704 |

(Continued)

FOREIGN PATENT DOCUMENTS

CN    203490474 U    3/2014

OTHER PUBLICATIONS

IBM, Compact thermal solution for wearable computer, Research Disclosure, Questel Ireland, Apr. 2000.*

*Primary Examiner* — Courtney Smith
*Assistant Examiner* — Sagar Shrestha
(74) *Attorney, Agent, or Firm* — C. G. Mersereau; Nikolai & Mersereau, P.A.

(57) ABSTRACT

A heat dissipation structure of wearable electronic device includes a wearable main body and a wearable strap body connected with the wearable main body. The wearable main body includes a receiving space, a circuit board and multiple electronic components arranged on the circuit board. At least one of the electronic components is a heat source. The wearable strap body has a heat conduction section and a protection section enclosing the heat conduction section. A section of the heat conduction section is exposed to an interior of the receiving space without being enclosed by the protection section. The exposed section of the heat conduction section is in contact with the corresponding heat source on the circuit board so as to greatly enhance the heat dissipation performance of the wearable electronic device.

16 Claims, 20 Drawing Sheets

(56) References Cited

U.S. PATENT DOCUMENTS

| | | | |
|---|---|---|---|
| 2010/0132930 A1* | 6/2010 | Izenson | F28D 5/00 165/168 |
| 2014/0135612 A1* | 5/2014 | Yuen | A61B 5/02405 600/407 |
| 2015/0029661 A1* | 1/2015 | Huang | G06F 1/203 361/679.54 |
| 2015/0077438 A1* | 3/2015 | Tamaki | A44C 5/00 345/672 |
| 2015/0185764 A1* | 7/2015 | Magi | G06F 1/163 361/679.03 |
| 2015/0346766 A1* | 12/2015 | Justice | G06F 1/163 361/679.03 |

* cited by examiner

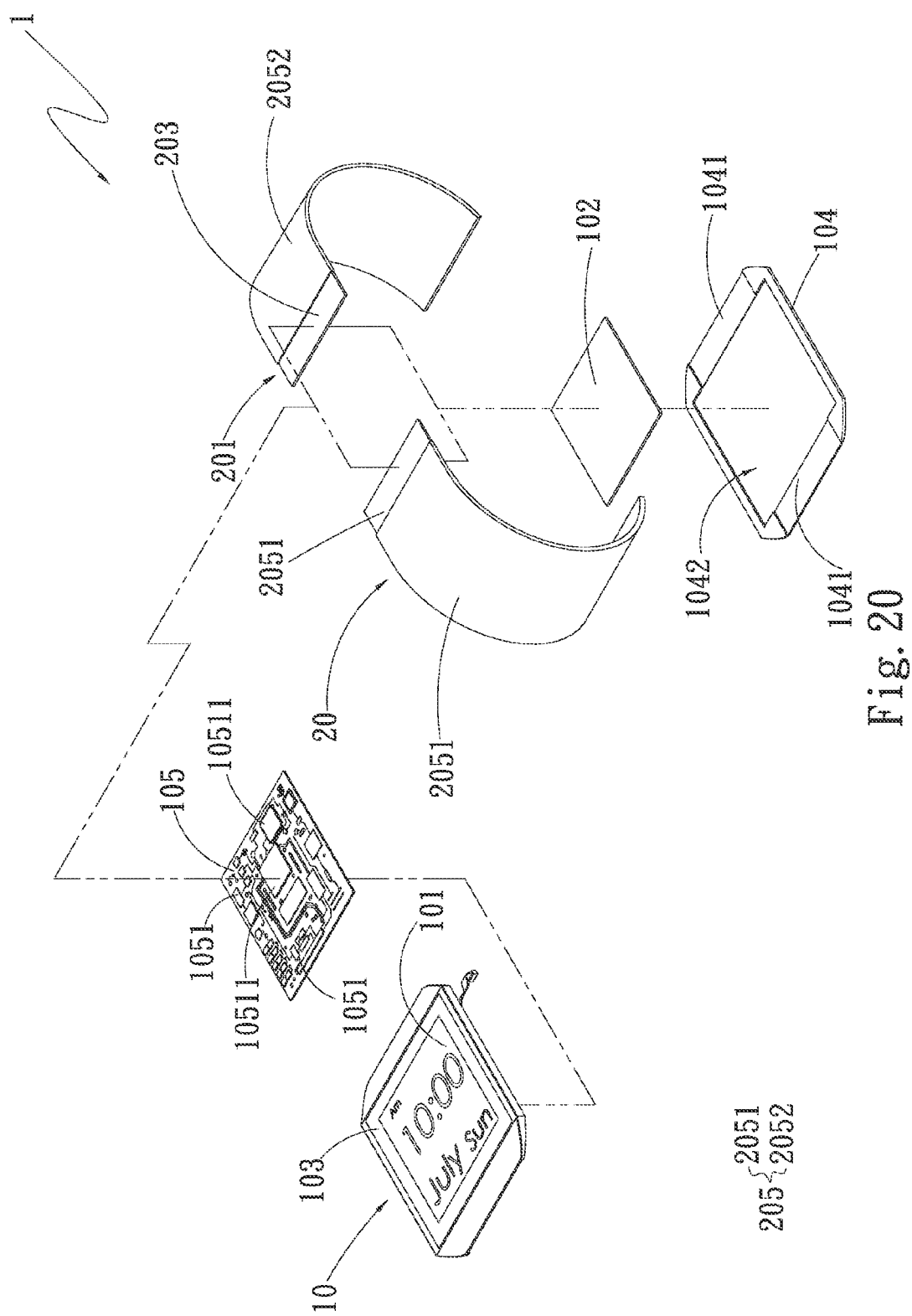

HEAT DISSIPATION STRUCTURE OF WEARABLE ELECTRONIC DEVICE

This application claims the priority benefit of Taiwan patent application number 103138957 filed on Nov. 10, 2014.

BACKGROUND OF THE INVENTION

1. Field of the Invention

The present invention relates generally to a wearable electronic device, and more particularly to a heat dissipation structure of wearable electronic device for dissipating the heat generated by the wearable electronic device.

2. Description of the Related Art

Various multifunction intelligent mobile devices have been developed, including mobile phones, tablets and even intelligent wearable electronic devices such as watches, necklaces and fingerings. Along with the continuous increase of the functions, the intelligent wearable electronic device is equipped with more and more components such as touch screen, central processor unit (CPU), graphic processing unit (GPU) and satellite positioning chip. The intelligent watch is connectable to other mobile devices via Bluetooth or network. Moreover, a SIN card can be inserted into the intelligent watch to access to 3G or 4G network and make phone calls.

When the conventional intelligent watch (or so-called wearable watch) operates or executes a function, the main operation/processing chips such as the CPU and the GPU inside the intelligent watch will generate heat. The heat can be hardly quickly dissipated outward. As a result, the heat will continuously accumulate on and around the CPU and GPU in the intelligent watch. This will lead to deterioration of execution efficiency of the intelligent watch or even shutdown of the intelligent watch. Furthermore, the heat will locally accumulate in the intelligent watch so that when a user wears the intelligent watch, the wrist section of the user will feel uncomfortable. Accordingly, it has become a critical issue how to solve the heat dissipation problem of the intelligent watch and various wearable mobile devices.

SUMMARY OF THE INVENTION

It is therefore a primary object of the present invention to provide a heat dissipation structure of wearable electronic device, which can effectively solve the heat accumulation problem of the wearable electronic device.

It is a further object of the present invention to provide the above heat dissipation structure of wearable electronic device, which enables a user to wear the wearable electronic device more comfortably.

To achieve the above and other objects, the heat dissipation structure of wearable electronic device of the present invention includes a wearable main body and a wearable strap body. The wearable main body includes a receiving space, a circuit board and multiple electronic components. The electronic components are arranged on the circuit board. The circuit board with the electronic components is received in the receiving space. At least one of the electronic components is a heat source. The wearable strap body is connected with the wearable main body. The wearable strap body has a heat conduction section and a protection section. The protection section encloses the heat conduction section. A section of the heat conduction section is exposed to an interior of the receiving space without being enclosed by the protection section. The exposed section of the heat conduction section is in contact with the corresponding heat source. By means of the heat dissipation structure of wearable electronic device of the present invention, the heat dissipation performance of the wearable electronic device is greatly enhanced. Accordingly, the heat will not accumulate in the wearable electronic device and a user can wear the wearable electronic device more comfortably.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 20 is another perspective exploded view of the ninth embodiment of the present invention.

DETAILED DESCRIPTION OF THE PREFERRED EMBODIMENTS

Figure 1:
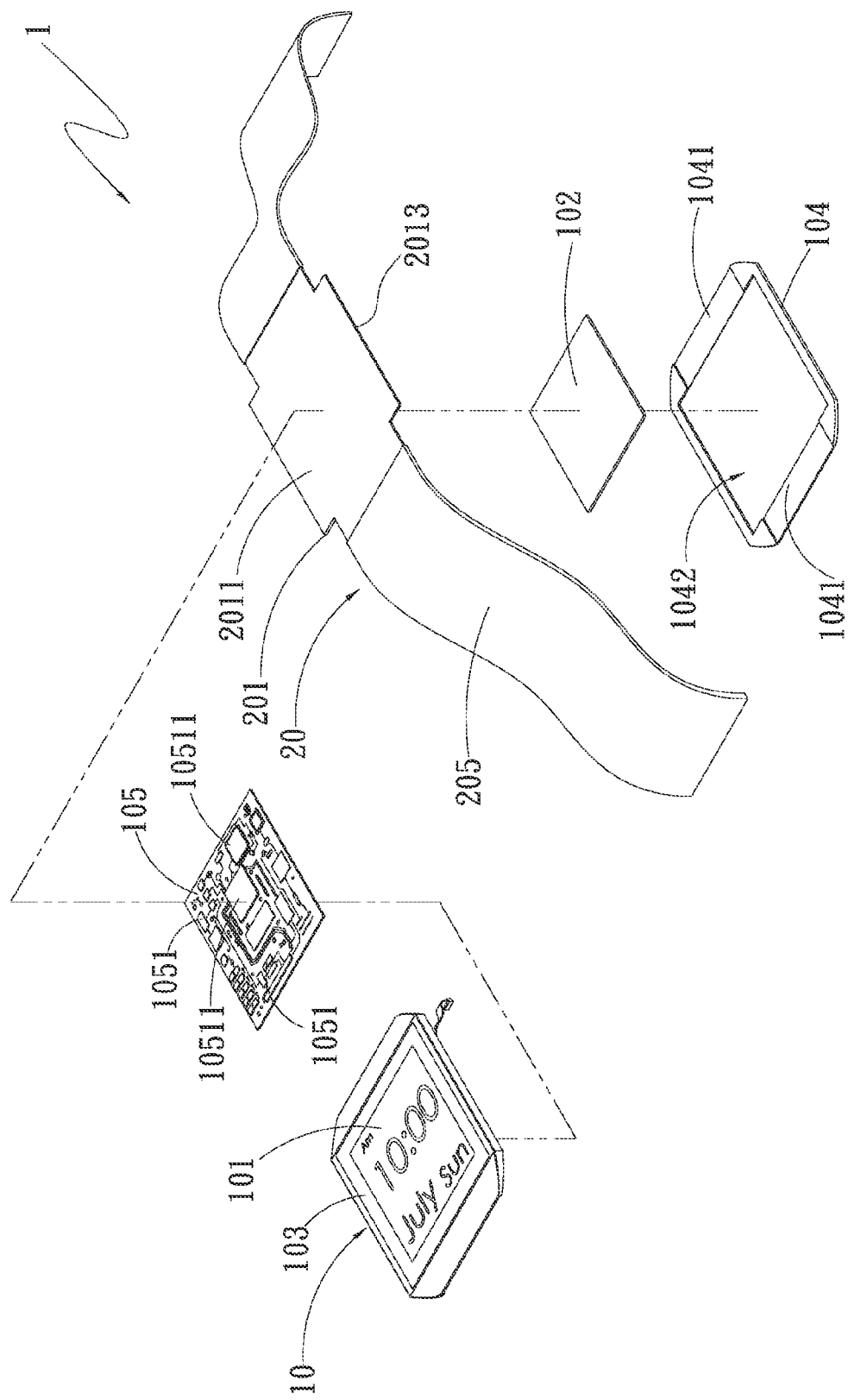
FIG. 1 is a perspective exploded view of a first embodiment of the present invention.
Figure 2:
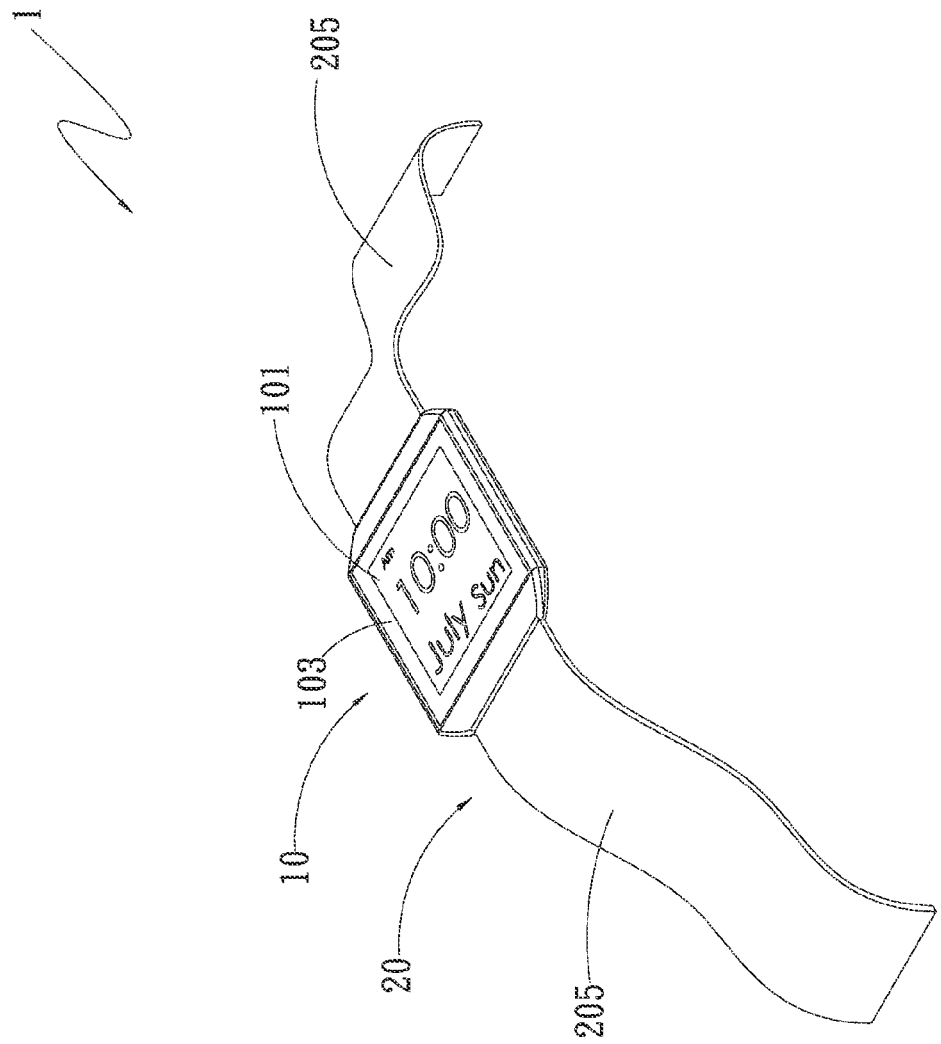
FIG. 2 is a perspective assembled view of the first embodiment of the present invention.
Figure 3:
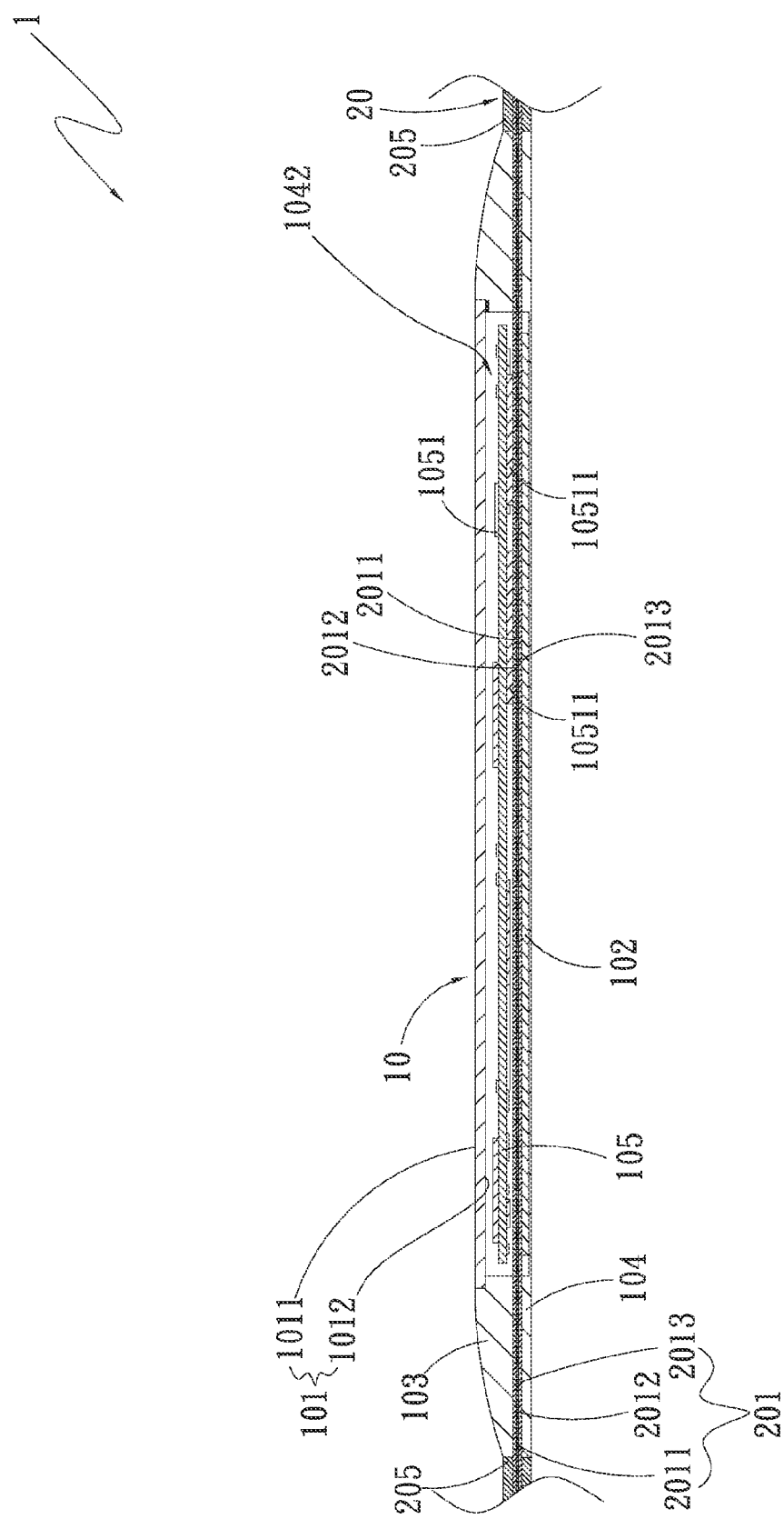
FIG. 3 is a sectional assembled view of the first embodiment of the present invention.

Please refer to FIGS. 1, 2 and 3. FIG. 1 is a perspective exploded view of a first embodiment of the present invention. FIG. 2 is a perspective assembled view of the first embodiment of the present invention. FIG. 3 is a sectional assembled view of the first embodiment of the present invention. According to the first embodiment, the heat dissipation structure 1 of wearable electronic device of the present invention is, but not limited to, a wearable watch (intelligent watch) for illustration purposes only. The wearable electronic device includes a wearable main body 10 and a wearable strap body 20. The wearable main body 10 includes a receiving space 1042, a circuit board 105, multiple electronic components 1051, a touch display module 101, a battery 102, an upper frame body 103 and a lower frame body 104. The upper frame body 103 receives the touch display module 101 therein. The touch display module 101 has a touch display face 1011 and a bottom face 1012. The touch display face 1011 is for a user to touch, operate and watch the displayed information. The bottom face 1012 faces the circuit board 105. In practice, the circuit board 105 is locked on the bottom face 1012 by means of multiple screws (not shown).

The upper frame body 103 is mated with the lower frame body 104 to cover the same. The lower frame body 104 is formed with the receiving space 1042 and multiple recesses 1041. A central section of one face of the lower frame body 104 is recessed to form the receiving space 1042 for receiving the circuit board 105, the electronic components 1051 and the battery 102 (such as lithium battery). The recesses 1041 are formed on two opposite sides of one face of the lower frame body 104 in adjacency to and in communication with the receiving space 1042. The battery 102 is positioned on the bottom of the receiving space 1042.

In this embodiment, the circuit board 105 preferably is, but not limited to, a printed circuit board (PCB) for illustration purposes only. The electronic components 1051 are arranged on the circuit board 105. At least one of the electronic components 1051 is a heat source 10511. In this embodiment, there are two heat sources 10511 for illustration. One of the heat sources is a central processor unit (CPU), while the other of the heat sources is a graphic processing unit (GPU). The rest electronic components 1051 are memory (such as flash memory) and other components (such as capacitors, resistors, transistors and IC chips). In practice, the heat sources 10511 are not limited to the above two heat sources 10511. The other electronic components 1051 can be also heat sources 10511 the heat of which needs to be dissipated. For example, the IC chips or battery can be also the heat sources 10511.

Please further refer to FIGS. 1 and 3. In this embodiment, the wearable strap body 20 is a flexible wearable strap body (soft watchstrap) for illustration. The wearable strap body 20 is connected with the wearable main body 10. The wearable strap body 20 has a heat conduction section 201 and a protection section 205. The protection section 205 is made of flexible plastic material. The protection section 205 encloses the heat conduction section 201. A section of the heat conduction section 201 is exposed to the interior of the receiving space 1042 without being enclosed by the protection section 205. That is, the other section of the heat conduction section 201 is enclosed in the protection section 205. This section is positioned on two lateral sides of the wearable main body 10 for a user to wear. The exposed section of the heat conduction section 201 in the receiving space 1042 is bridged over the receiving space 1042 to extend from one recess 1041 of the lower frame body 104 into the other opposite recess 1041 of the lower frame body 104. One face of the exposed section of the heat conduction section 201 is in contact with (or in attachment to) the corresponding heat source 10511 (the CPU and the GPU). The exposed section of the heat conduction section 201 absorbs the heat generated by the heat source 10511 and quickly conducts the heat to the other part of the heat conduction section 201 to dissipate the heat outside. In this embodiment, the circuit board 105 is positioned on upper side of the exposed section of the heat conduction section 201, while the battery 102 is positioned under the exposed section of the heat conduction section 201 for illustration. In practice, the arrangement positions of the circuit board 105 and the battery 102 can be changed. Alternatively, the circuit board can be positioned under the heat conduction section 201 in adjacency to the battery 102. The heat source 10511 is still in attachment to the exposed section of the heat conduction section 201.

In this embodiment, the wearable strap body 20 is an integrated elongated watchstrap for illustration. A middle section of the wearable strap body 20, (that is, the exposed section of the heat conduction section 201) is received in the receiving space 1042 to absorb the heat of the heat source and quickly conduct the heat to the front section and/or rear section of the wearable strap body 20 on at least one side of the wearable main body 10. The heat conduction section 201 enclosed in the front and rear sections will absorb the heat to dissipate the heat outside. Accordingly, the heat generated by the CPU and GPU of the wearable main body 10 will not accumulate in the wearable main body 10. In this case, the CPU and GPU can stably and quickly operate. In addition, a user can wear the wearable main body more comfortably.

The heat conduction section 201 is made of graphite, metal foil or a combination thereof. In this embodiment, the heat conduction section 201 has, but not limited to, three heat conduction layers for illustration purposes only. In practice, the heat conduction section 201 can be alternatively designed with one heat conduction layer (graphite or metal foil), two heat conduction layers, four heat conduction layers or more heat conduction layers. The heat conduction section 201 has a first heat conduction layer 2011, a second heat conduction layer 2012 and a third heat conduction layer 2013. The first and third heat conduction layers 2011, 2013 are made of metal foils, and preferably copper foils. The second heat conduction layer 2012 is made of graphite material. However, the material of the heat conduction layers is not limited to the above material. In practice, the first, second and third heat conduction layers 2011, 2012, 2013 can be made of graphite, metal foils (gold foils, silver foils, copper foils or aluminum foils) or the combination of graphite and metal foils. For example, the first and second heat conduction layers 2011, 2012 are made of graphite, while the third heat conduction layer 2013 is made of copper foil or the first heat conduction layer 2011 is made of copper foil, while the second and third heat conduction layers 2012, 2013 are made of graphite, and so on.

The second heat conduction layer 2012 is sandwiched between the first heat conduction layer 2011 and the third heat conduction layer 2013. The other face of the exposed section of the heat conduction section 201, (that is, the outer face of the third heat conduction layer 2013) is attached to the battery 102. The protection section 205 encloses the outer faces of the first and third heat conduction layers 2011, 2013 of the other section of the heat conduction section 201, (that is, the other section of the heat conduction section 201, which is enclosed in the front and rear sections of the wearable strap body 20). The outer face of the first heat conduction layer 2011 of the exposed section of the heat conduction section 201 in the receiving space 1042, (that is, the exposed section of the heat conduction section 201 at the middle of the wearable strap body 20) is attached to the heat sources 10511 (the CPU and the GPU). Accordingly, the first heat conduction layer 2011 will absorb the heat generated by the CPU and the GPU and quickly conduct the heat to the second and third heat conduction layers 2012, 2013. At the same time, the third heat conduction layer 2013 will absorb the heat of the battery 102. The heat is then transferred to the other section of the heat conduction section 201, (that is, the front and rear sections of the wearable strap body 20 on two sides of the wearable main body 10) and dissipated outward. Accordingly, the heat of the wearable main body 10 is quickly dissipated.

Therefore, the heat conduction section 201 is enclosed in the wearable strap body 20. A part of the heat conduction section 201 is exposed to attach to the heat source 10511 of the wearable main body 10, whereby the heat dissipation performance of the wearable electronic device is greatly enhanced. Accordingly, the heat will not accumulate in the wearable main body 10 and a user can wear the wearable main body 10 more comfortably.

Figure 4:
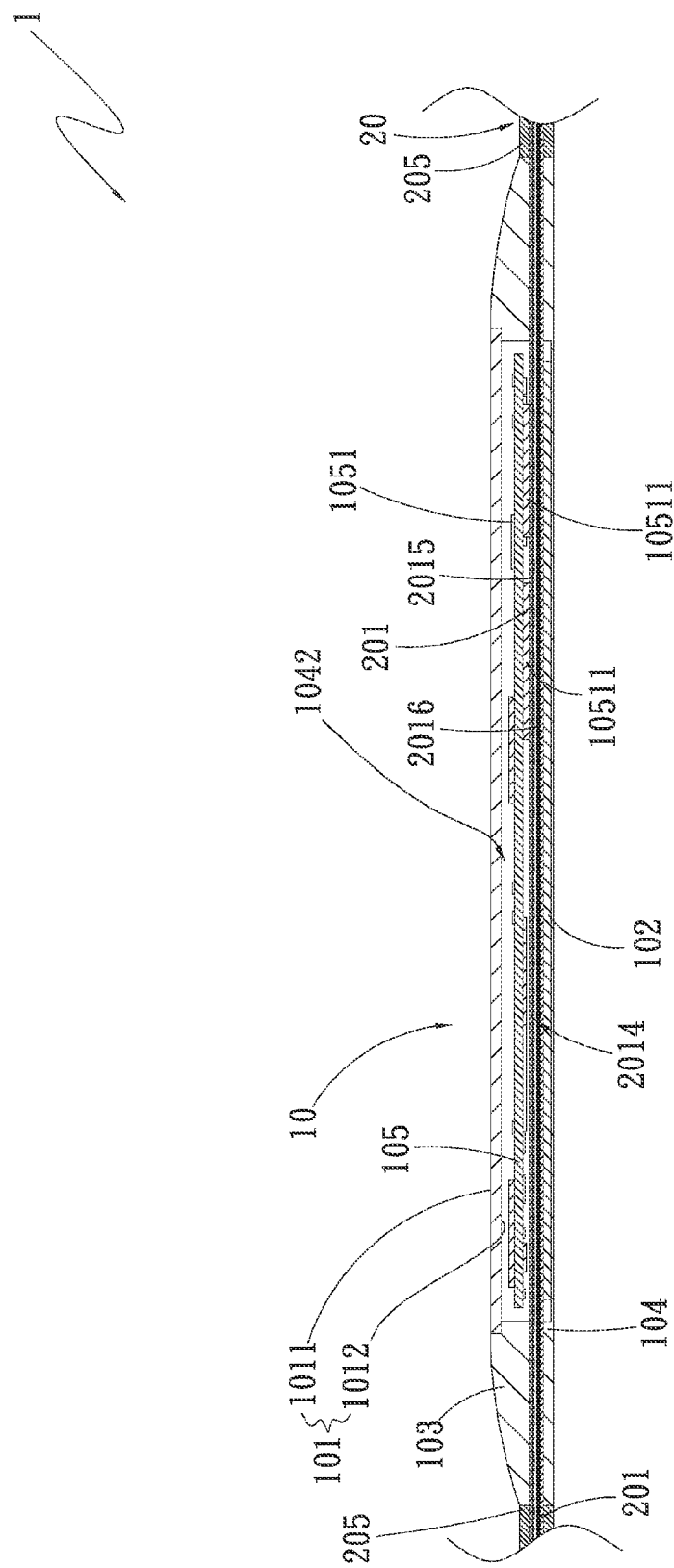
FIG. 4 is a sectional assembled view of a second embodiment of the present invention.

Please now refer to FIG. 4, which is a sectional assembled view of a second embodiment of the present invention. Also referring to FIGS. 1 and 2, the second embodiment is substantially identical to the first embodiment in structure, connection relationship and effect and thus will not be repeatedly described. The second embodiment is mainly different from the first embodiment in that the heat conduction section 201 is a flexible heat pipe. That is, the heat conduction section 201 is a flexible heat pipe made of flexible metal material (such as copper material), flexible thin heat pipe made of flexible metal material (such as copper material or aluminum material) or flexible thin heat pipe made of flexible nonmetal material (such as plastic, rubber or polyethylene terephthalate, PET). The protection section 205 is made of flexible plastic material or hard plastic material. In this embodiment, the protection section 205 is made of flexible plastic material for illustration.

In this embodiment, the heat conduction section 201 is a flexible heat pipe for illustration. The heat conduction section 201 has a chamber 2014 and a capillary structure 2015. A working fluid 2016 is filled in the chamber 2014. The working fluid 2016 is selected from a group consisting of pure water, inorganic compound, alcohol group, ketone group, liquid metal, coolant and organic compound.

The capillary structure 2015 is formed on inner wall face of the chamber 2014. The other face of the exposed section of the heat conduction section 201 in the receiving space 1042 is attached to the battery 102. One face of the exposed section of the heat conduction section 201, (that is, one face of the flexible heat pipe) is attached to the heat sources 10511 (the CPU and the GPU). The exposed section of the heat conduction section 201 absorbs the heat generated by the heat sources 10511 and the battery 102 and conducts the heat into the chamber 2014 for heat exchange. After the working fluid 2016 in the chamber 2014 is evaporated, the vapor working fluid spreads within the chamber 2014 to the chamber 2014 of the other section of the heat conduction section 201, (that is, the chamber of the front and rear sections of the wearable strap body 20 on two sides of the wearable main body 10). The vapor working fluid is cooled and condensed in the chamber 2014 of the other section of the heat conduction section 201. Thereafter, under the capillary attraction of the capillary structure 2016 in the chamber 2014 of the other section of the heat conduction section 201, the liquid working fluid flows back to the exposed section of the heat conduction section 201 (at the middle of the wearable strap body 20) for next vapor-liquid circulation. Accordingly, the heat generated by the heat sources 10511 of the wearable main body 10 can be quickly dissipated.

Therefore, the heat conduction section 201 enclosed in the wearable strap body 20 is a flexible heat pipe. A part of the heat conduction section 201 is exposed to attach to the heat sources 10511 of the wearable main body 10, whereby the heat dissipation performance of the wearable electronic device is greatly enhanced. Accordingly, the heat will not accumulate in the wearable main body 10 and a user can wear the wearable main body 10 more comfortably.

Figure 5:
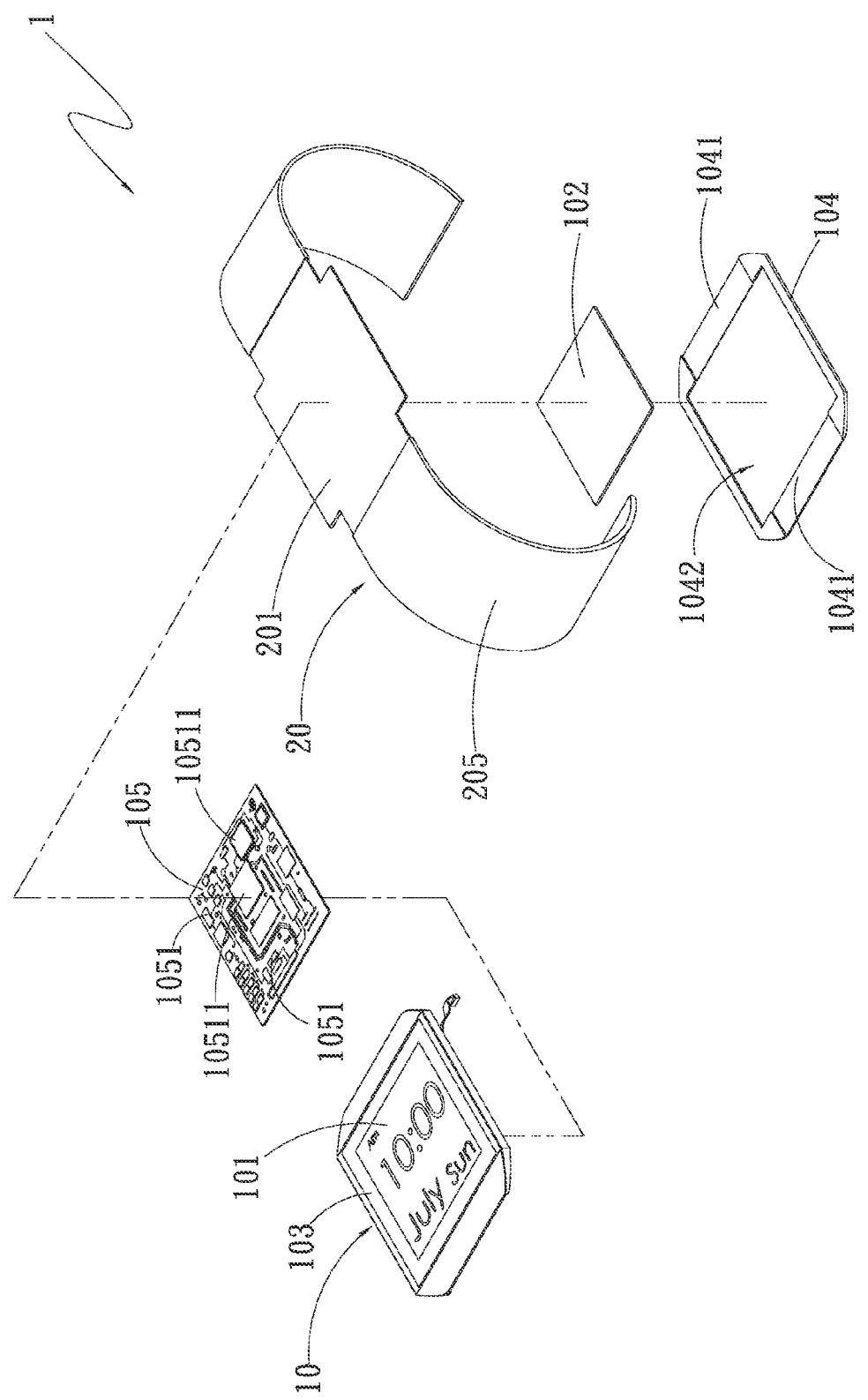
FIG. 5 is a perspective exploded view of a third embodiment of the present invention.
Figure 6:
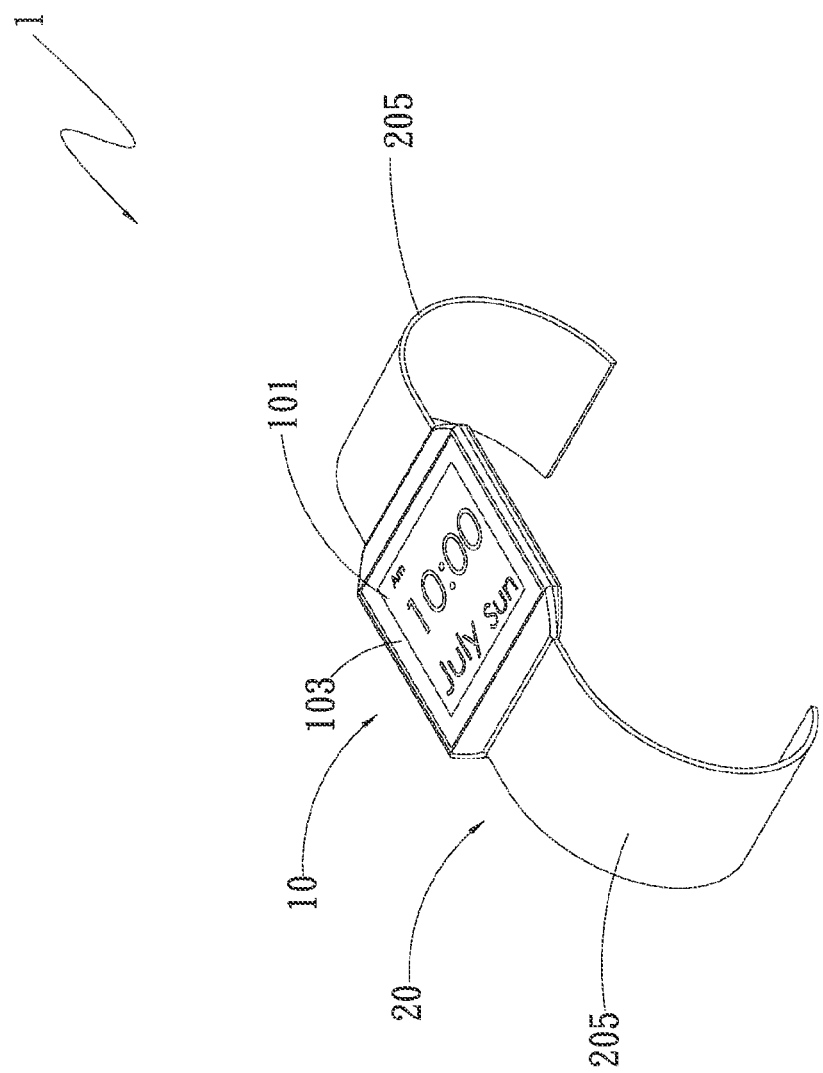
FIG. 6 is a perspective assembled view of the third embodiment of the present invention.

Please now refer to FIGS. 5 and 6. FIG. 5 is a perspective exploded view of a third embodiment of the present invention. FIG. 6 is a perspective assembled view of the third embodiment of the present invention. Also referring to FIG. 4, the third embodiment is substantially identical to the second embodiment in structure, connection relationship and effect and thus will not be repeatedly described. The third embodiment is different from the second embodiment in that the heat conduction section 201 is a heat pipe made of hard metal material and the protection section 205 is made of hard plastic material. Therefore, the front and rear sections of the wearable strap body 20, (that is, the other section of the heat conduction section 201 enclosed in the protection section 205) are inward bent toward the center of the lower frame body 104 and secured to form a fitting opening 208. A user can directly wear the wearable main body through the fitting opening 208.

Therefore, the heat conduction section 201 enclosed in the wearable strap body 20 is a heat pipe. A part of the heat conduction section 201 is exposed to attach to the heat sources 10511 of the wearable main body 10, whereby the heat dissipation performance of the wearable electronic device is greatly enhanced. Accordingly, the heat will not accumulate in the wearable main body 10 and a user can wear the wearable main body 10 more comfortably.

Figure 7:
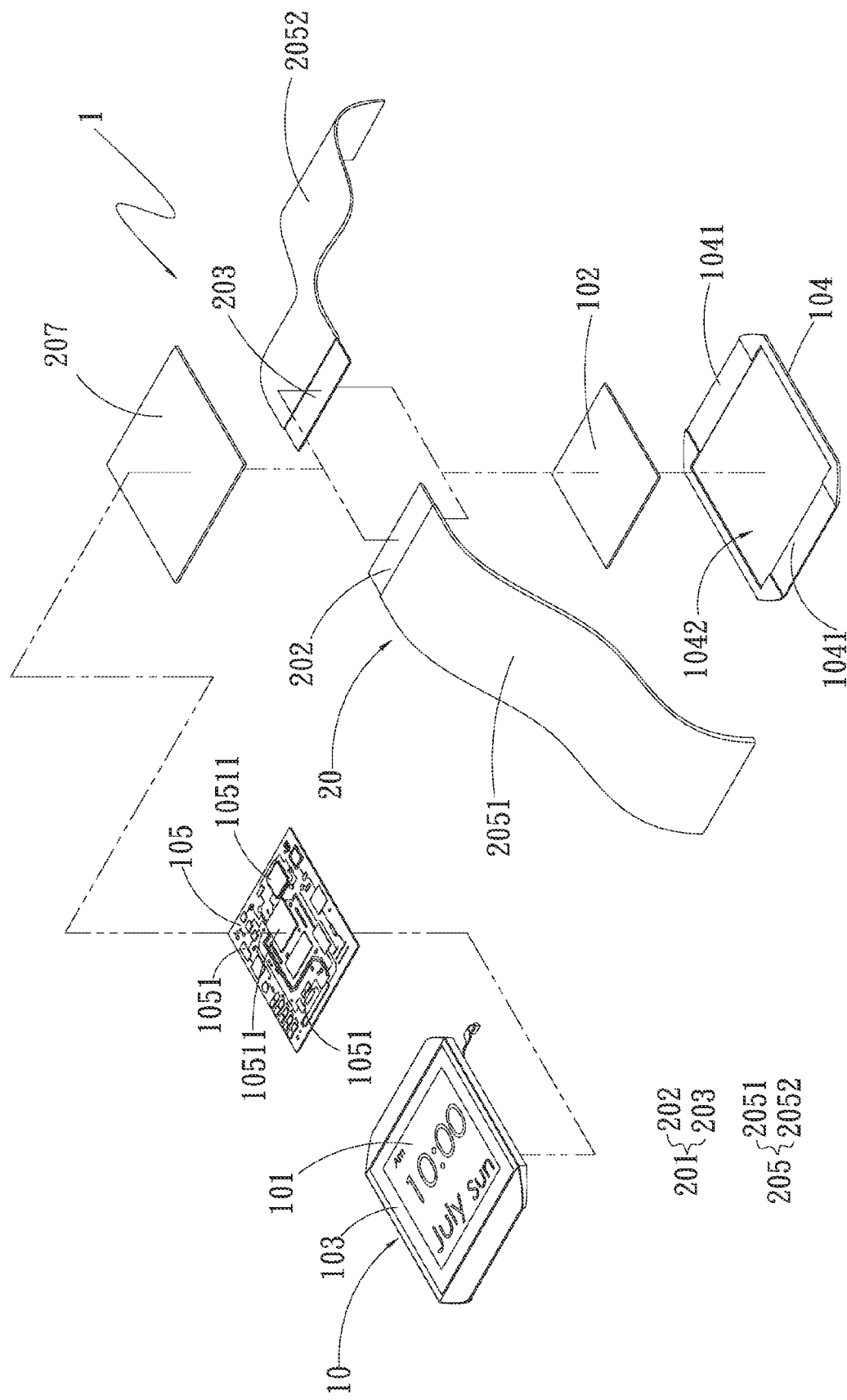
FIG. 7 is a perspective exploded view of a fourth embodiment of the present invention.
Figure 8:
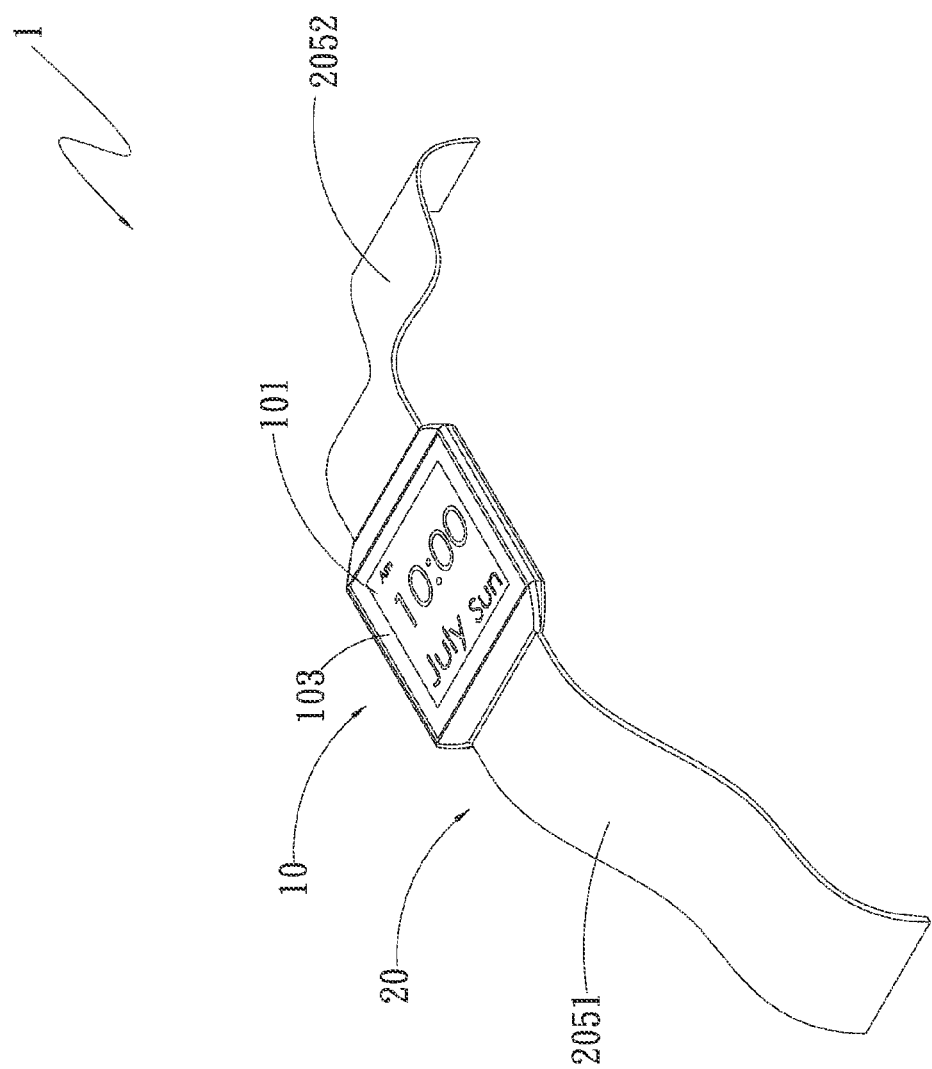
FIG. 8 is a perspective assembled view of the fourth embodiment of the present invention.
Figure 9:
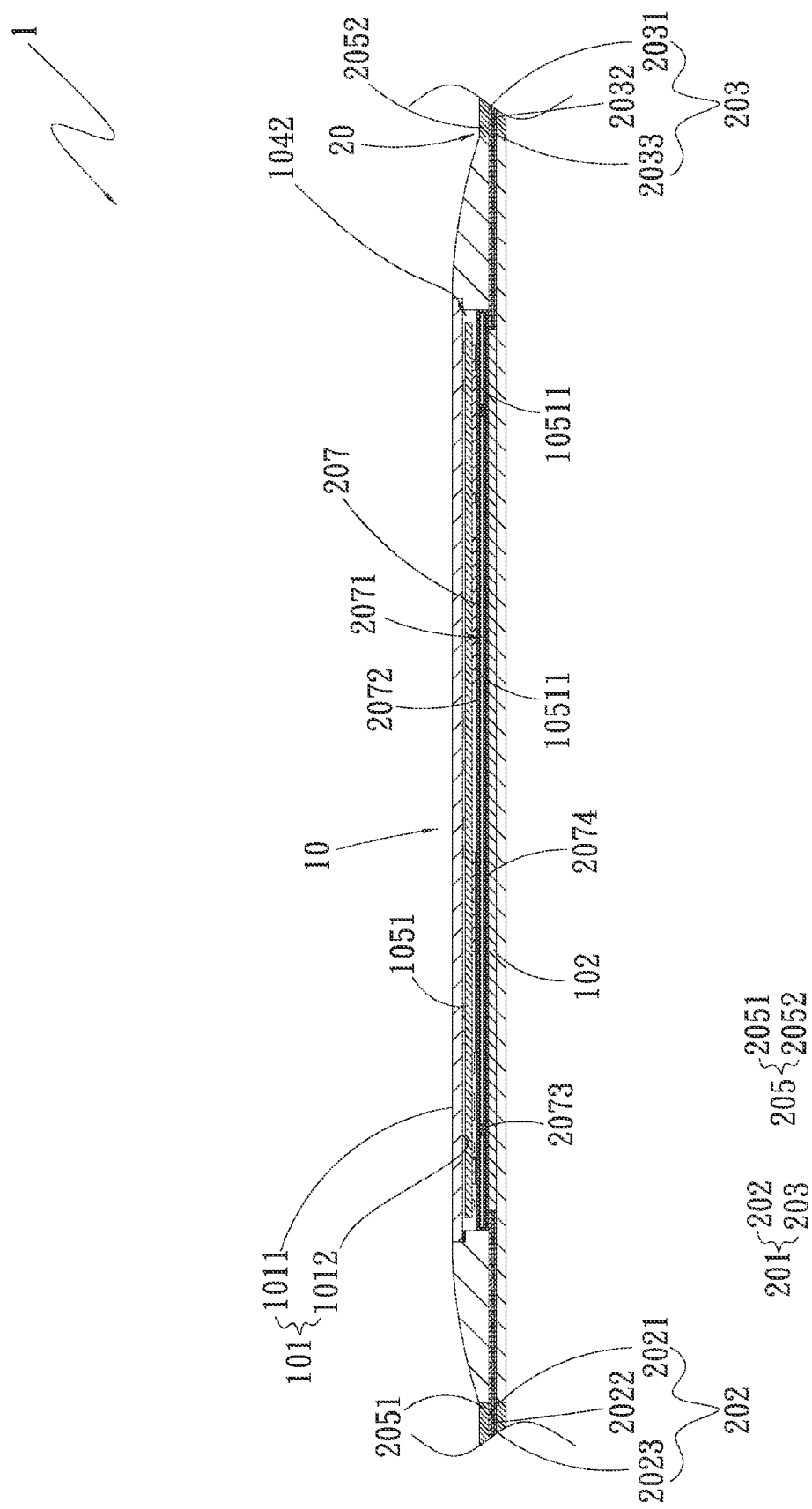
FIG. 9 is a sectional assembled view of the fourth embodiment of the present invention.

Please now refer to FIGS. 7, 8 and 9. FIG. 7 is a perspective exploded view of a fourth embodiment of the present invention. FIG. 8 is a perspective assembled view of the fourth embodiment of the present invention. FIG. 9 is a sectional assembled view of the fourth embodiment of the present invention. The fourth embodiment is substantially identical to the first embodiment in structure, connection relationship and effect and thus will not be repeatedly described. The fourth embodiment is different from the first embodiment in that the wearable strap body 20 is changed from the above integrated elongated watchstrap into a two-piece elongated watchstrap. Also, the exposed section of the heat conduction section 201 of the wearable strap body 20 is not attached to the heat sources 10511. Instead, the exposed section of the heat conduction section 201 is attached to a conduction section 207 attached to the heat sources 10511. However, in practice, according to the number of the heat sources 10511 and the heat dissipation requirement, the exposed section of the heat conduction section 201 can be not only attached to the conduction section 207 attached to the heat sources 10511, but also attached to the corresponding heat sources 10511.

The heat conduction section 201 has a first heat conduction body 202 and a second heat conduction body 203. The protection section 205 has a first protection body 2051 and a second protection body 2052. The first and second protection bodies 2051, 2052 respectively enclose the first and second heat conduction bodies 202, 203. A section of the first and second heat conduction bodies 202, 203 is exposed to the interior of the receiving space 1042 and is not enclosed by the first and second protection bodies 2051, 2052. That is, the other section of the first and second heat conduction bodies 202, 203 is enclosed in the first and second protection bodies 2051, 2052. This section is positioned on two sides of the wearable main body 10 for a user to wear.

In this embodiment, the wearable strap body 20 is a two-piece elongated watchstrap for illustration. The rear sections of the wearable strap body 20, (that is, the exposed sections of the first and second heat conduction bodies 202, 203) are received in the receiving space 1042 for indirectly absorbing the heat (via the conduction section 207) and quickly conducting the heat to the front and middle sections of the wearable strap body 20 on two sides of the wearable main body 10. The first and second heat conduction bodies 202, 203 enclosed in the front and middle sections of the wearable strap body 20 will absorb the heat to dissipate the heat outward. Therefore, the heat generated by the CPU and the GPU of the wearable main body 10 will not accumulate in the wearable main body 10. Accordingly, the CPU and the GPU can stably and quickly operate and the user can wear the wearable main body more comfortably.

The exposed sections of the first and second heat conduction bodies 202, 203 are respectively received in the recesses 1041 and protrude to the center of the receiving space 1042. The exposed sections of the first and second heat conduction bodies 202, 203 are opposite to each other. The battery 102 is positioned under the exposed sections of the first and second heat conduction bodies 202, 203. Each of the first and second heat conduction bodies 202, 203 has a first heat conduction layer 2021, 2031, a second heat conduction layer 2022, 2032 and a third heat conduction layer 2023, 2033. The first and third heat conduction layers 2021, 2031, 2023, 2033 of the first and second heat conduction bodies 202, 203 are made of metal foils (such as gold foils, silver foils, copper foils or aluminum foils). In this embodiment, the first and third heat conduction layers 2021, 2031, 2023, 2033 of the first and second heat conduction bodies 202, 203 are made of copper foils for illustration. The second heat conduction layers 2022, 2032 of the first and second heat conduction bodies 202, 203 are made of graphite material. The first and second protection bodies 2051, 2052 are made of flexible plastic material.

The second heat conduction layer 2022 of the first heat conduction body 202 is sandwiched between the first and third heat conduction layers 2021, 2023 of the first heat conduction body 202. The second heat conduction layer 2032 of the second heat conduction body 203 is sandwiched between the first and third heat conduction layers 2031, 2033 of the second heat conduction body 203. The first and second protection bodies 2051, 2052 respectively encloses the outer faces of the first and third heat conduction layers 2021, 2031, 2023, 2033 of the other sections of the first and second heat conduction bodies 202, 203, (that is, the heat conduction section 201 enclosed in the front and middle sections of the wearable strap body 20). The wearable main body 10 further includes a conduction section 207 received in the receiving space 1042 and positioned right under the circuit board 105. The first and second heat conduction bodies 202, 203 are positioned under the conduction section 207, that is, the conduction section 207 is positioned on upper sides of the first and second heat conduction bodies 202, 203. In this embodiment, the conduction section 207 is, but not limited to, a vapor chamber for illustration purposes only. In practice, the conduction section 207 can be alternatively a heat pipe or other heat conduction component. The vapor chamber (the conduction section 207) has a chamber 2071, a capillary structure 2072 and multiple support columns 2073. A working fluid 2074 is filled in the chamber 2071. The working fluid 2074 is selected from a group consisting of pure water, inorganic compound, alcohol group, ketone group, liquid metal, coolant and organic compound. The capillary structure 2072 is formed on inner wall face of the chamber 2071. The support columns 2073 are received in the chamber 2071. Top ends and bottom ends of the support columns 2073 respectively abut against upper and lower walls of the chamber 2071.

Two opposite sides of one face of the conduction section 207 respectively contact one face of the corresponding exposed sections of the first and second heat conduction bodies 202, 203. The rest part of the face of the conduction section 207 is attached to the battery 102. The other face of the conduction section 207 is attached to the heat sources 10511, (that is, the CPU and the GPU) on the circuit board 105. In addition, the other face of the conduction section 207 corresponds to the bottom face 1012 of the touch display module 101. Therefore, the conduction section 207 absorbs the heat generated by the heat sources 10511 and the battery 102 and conducts the heat to the outer faces of the first heat conduction layers 2021, 2031 of the exposed sections of the first and second heat conduction bodies 202, 203. Then the first heat conduction layers 2021, 2031 of the exposed sections of the first and second heat conduction bodies 202, 203 will quickly conduct the heat to the second and third heat conduction layers 2022, 2023, 2032, 2033. At the same time, the heat is transferred to the other sections of the first and second heat conduction bodies 202, 203, (that is, the front and middle sections of the wearable strap body 20 on two sides of the wearable main body 10) and dissipated outward. Accordingly, the heat of the wearable main body 10 can be quickly dissipated.

Therefore, the first and second heat conduction bodies 202, 203 are enclosed in the wearable strap body 20. A part of the first and second heat conduction bodies 202, 203 is exposed to attach to the conduction section 207. The conduction section 207 is attached to the heat sources 10511 of the wearable main body 10, whereby the heat dissipation performance of the wearable electronic device is greatly enhanced. Accordingly, the heat will not accumulate in the wearable main body 10 and a user can wear the wearable main body 10 more comfortably.

Figure 10:
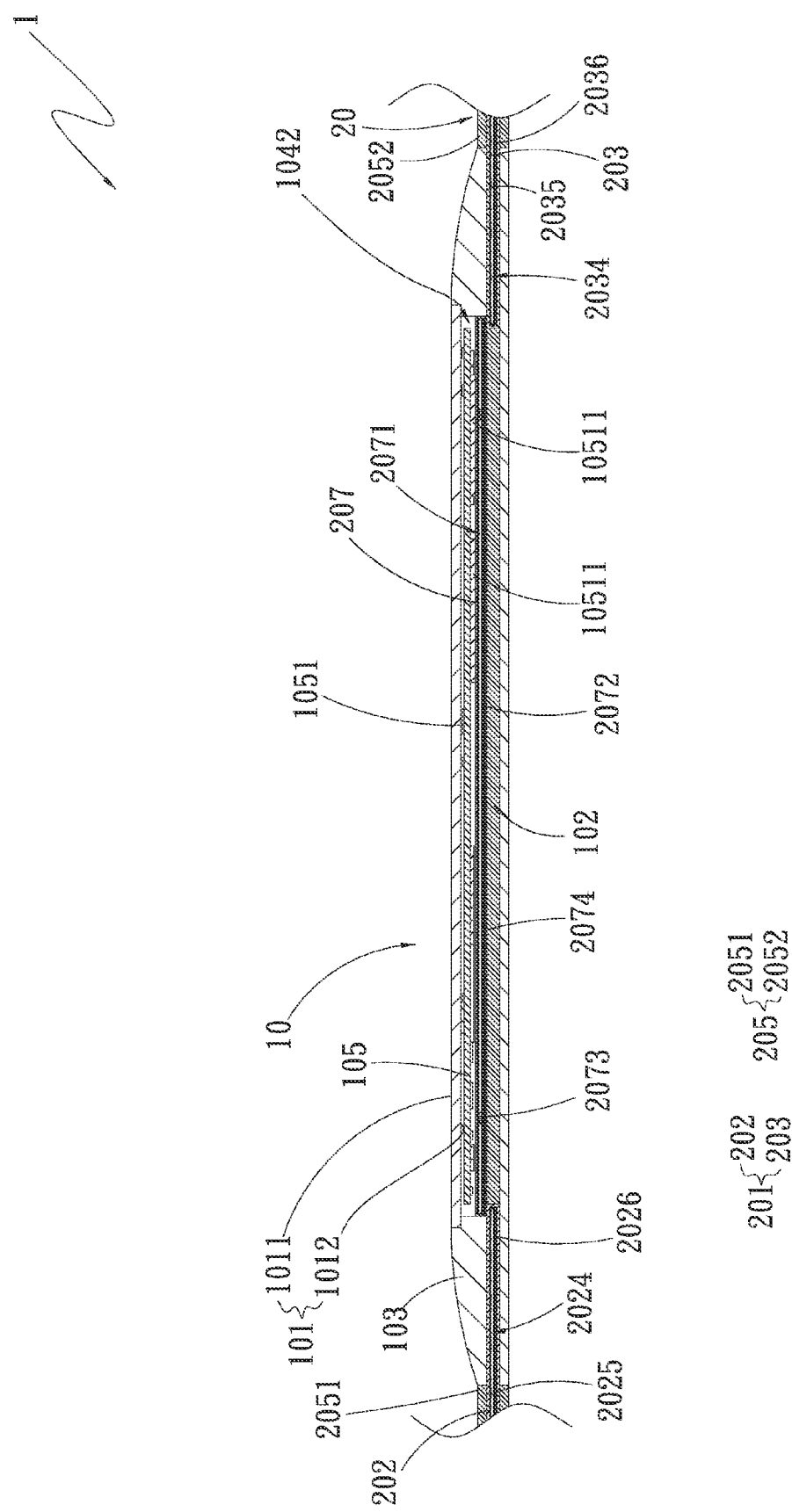
FIG. 10 is a sectional assembled view of a fifth embodiment of the present invention.

Please now refer to FIG. 10, which is a sectional assembled view of a fifth embodiment of the present invention. Also referring to FIGS. 7 and 8, the fifth embodiment is substantially identical to the fourth embodiment in structure, connection relationship and effect and thus will not be repeatedly described. The fifth embodiment is mainly different from the fourth embodiment in that the heat conduction section 201 is a flexible heat pipe. That is, the first and second heat conduction bodies 202, 203 are flexible heat pipes made of flexible metal material (such as copper material). Each of the first and second heat conduction bodies 202, 203 has a chamber 2024, 2034 and a capillary structure 2025, 2035. A working fluid 2026, 2036 is filled in the chamber 2024, 2034 of each of the first and second heat conduction bodies 202, 203. The working fluid 2026, 2036 is selected from a group consisting of pure water, inorganic compound, alcohol group, ketone group, liquid metal, coolant and organic compound. The capillary structure 2025, 2035 of each of the first and second heat conduction bodies 202, 203 is formed on inner wall face of the chamber 2024, 2034. The first and second protection bodies 2051, 2052 are made of flexible plastic material or hard plastic material. In this embodiment, the first and second protection bodies 2051, 2052 are made of flexible plastic material for illustration.

Therefore, the first and second heat conduction bodies 202, 203 enclosed in the wearable strap body 20 are flexible heat pipes. A part of the first and second heat conduction bodies 202, 203 is attached to the conduction section 207.

The conduction section 207 is attached to the heat sources 10511 of the wearable main body 10, whereby the heat dissipation performance of the wearable electronic device is greatly enhanced. Accordingly, the heat will not accumulate in the wearable main body 10 and a user can wear the wearable main body 10 more comfortably.

Figure 11:
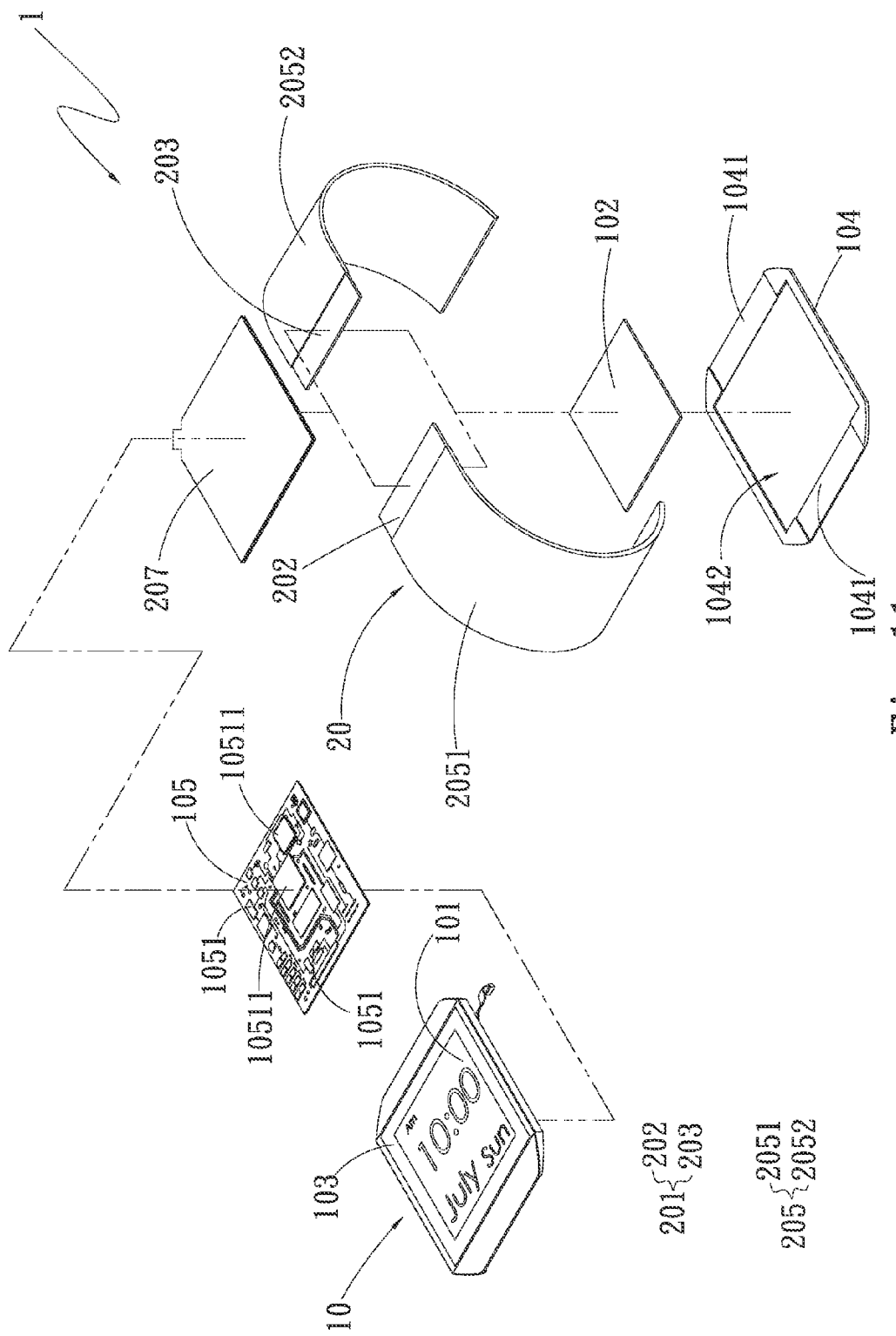
FIG. 11 is a perspective exploded view of a sixth embodiment of the present invention.
Figure 12:
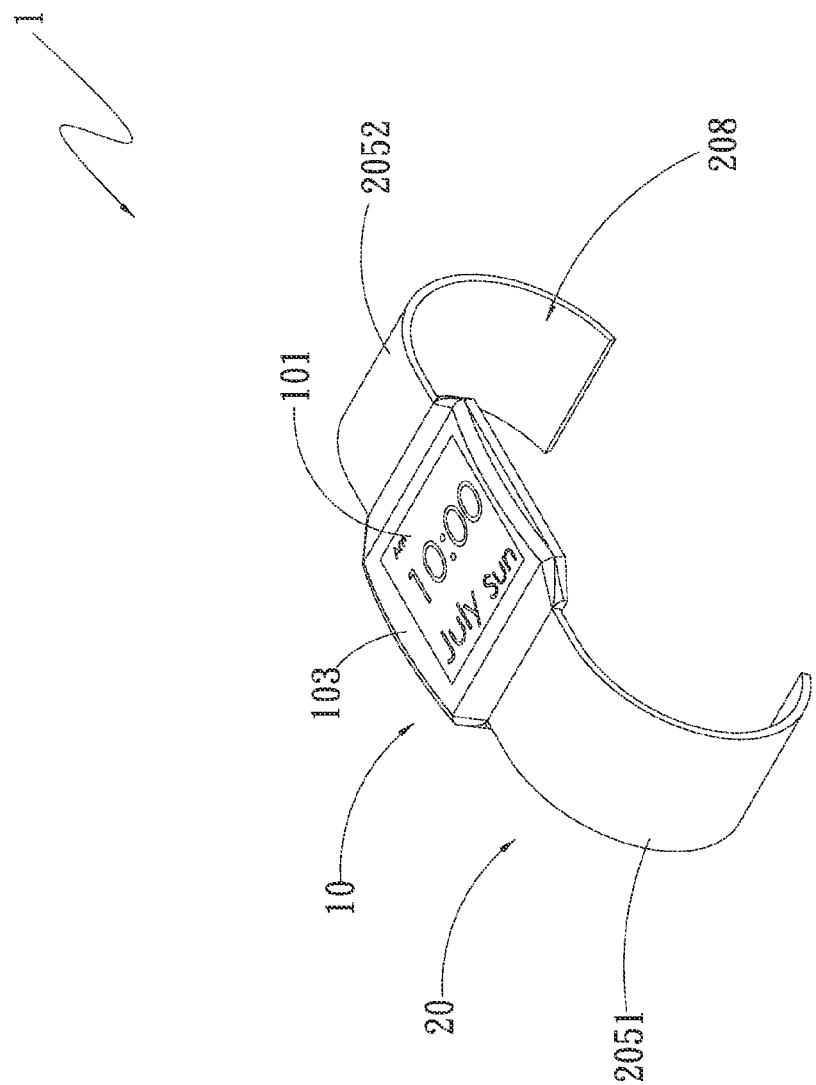
FIG. 12 is a perspective assembled view of the sixth embodiment of the present invention.

Please now refer to FIGS. 11 and 12. FIG. 11 is a perspective exploded view of a sixth embodiment of the present invention. FIG. 12 is a perspective assembled view of the sixth embodiment of the present invention. Also referring to FIG. 10, the sixth embodiment is substantially identical to the fifth embodiment in structure, connection relationship and effect and thus will not be repeatedly described. The sixth embodiment is different from the fifth embodiment in that the first and second heat conduction bodies 202, 203 are heat pipes made of hard metal material and the first and second protection bodies 2051, 2052 are made of hard plastic material. Therefore, the front and middle sections of the wearable strap body 20, (that is, the other section of the first heat conduction body 202 enclosed in the first protection body 2051 and the other section of the second heat conduction body 203 enclosed in the second protection body 2052) are respectively inward bent toward the center of the lower frame body 104 and secured to form a fitting opening 208. A user can directly wear the wearable main body through the fitting opening 208.

Therefore, the first and second heat conduction bodies 202, 203 enclosed in the wearable strap body 20 are heat pipes. A part of the first and second heat conduction bodies 202, 203 is exposed to attach to the conduction section 207. The conduction section 207 is attached to the heat sources 10511 of the wearable main body 10, whereby the heat dissipation performance of the wearable electronic device is greatly enhanced. Accordingly, the heat will not accumulate in the wearable main body 10 and a user can wear the wearable main body 10 more comfortably.

Figure 13:
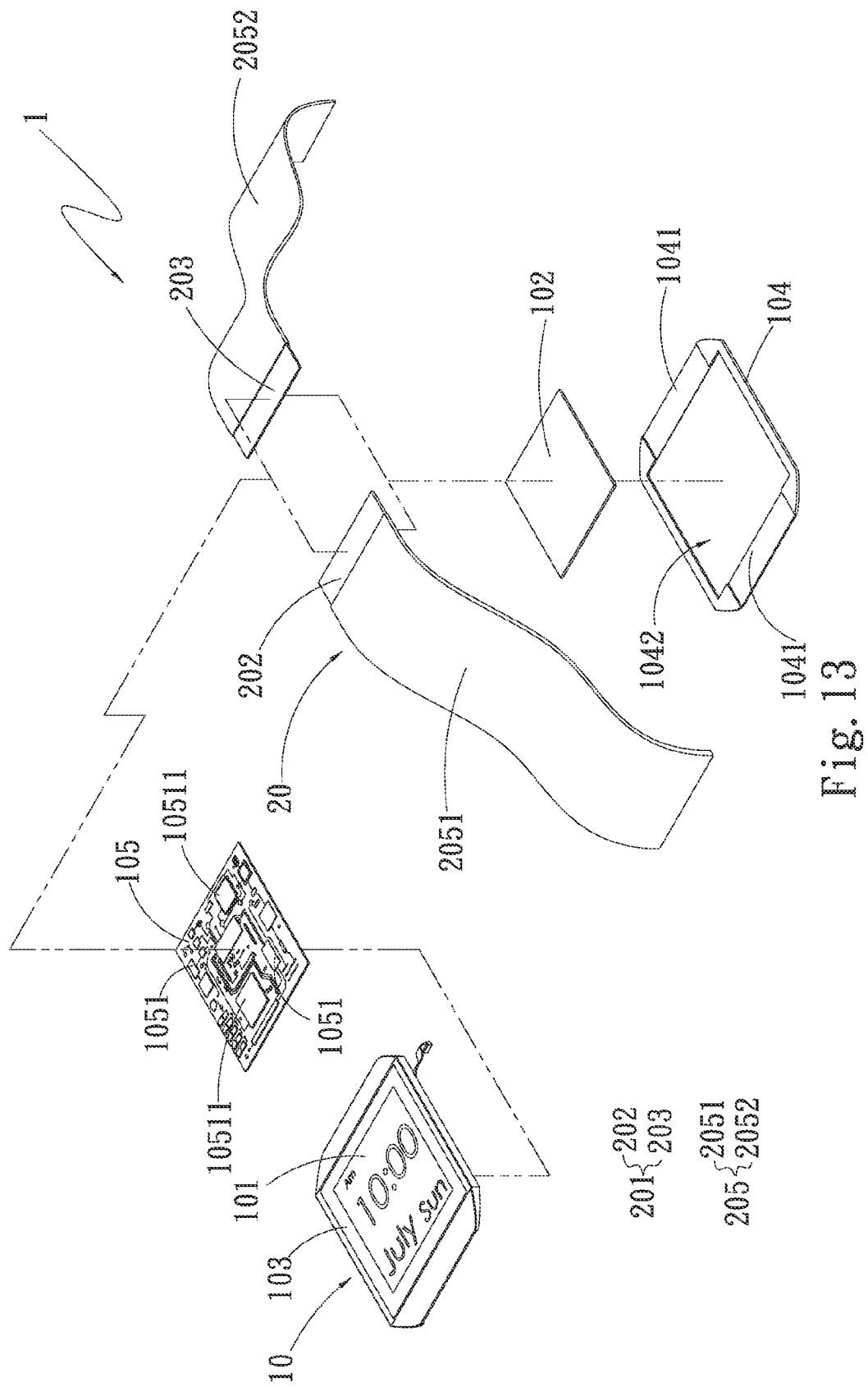
FIG. 13 is a perspective exploded view of a seventh embodiment of the present invention.
Figure 14:
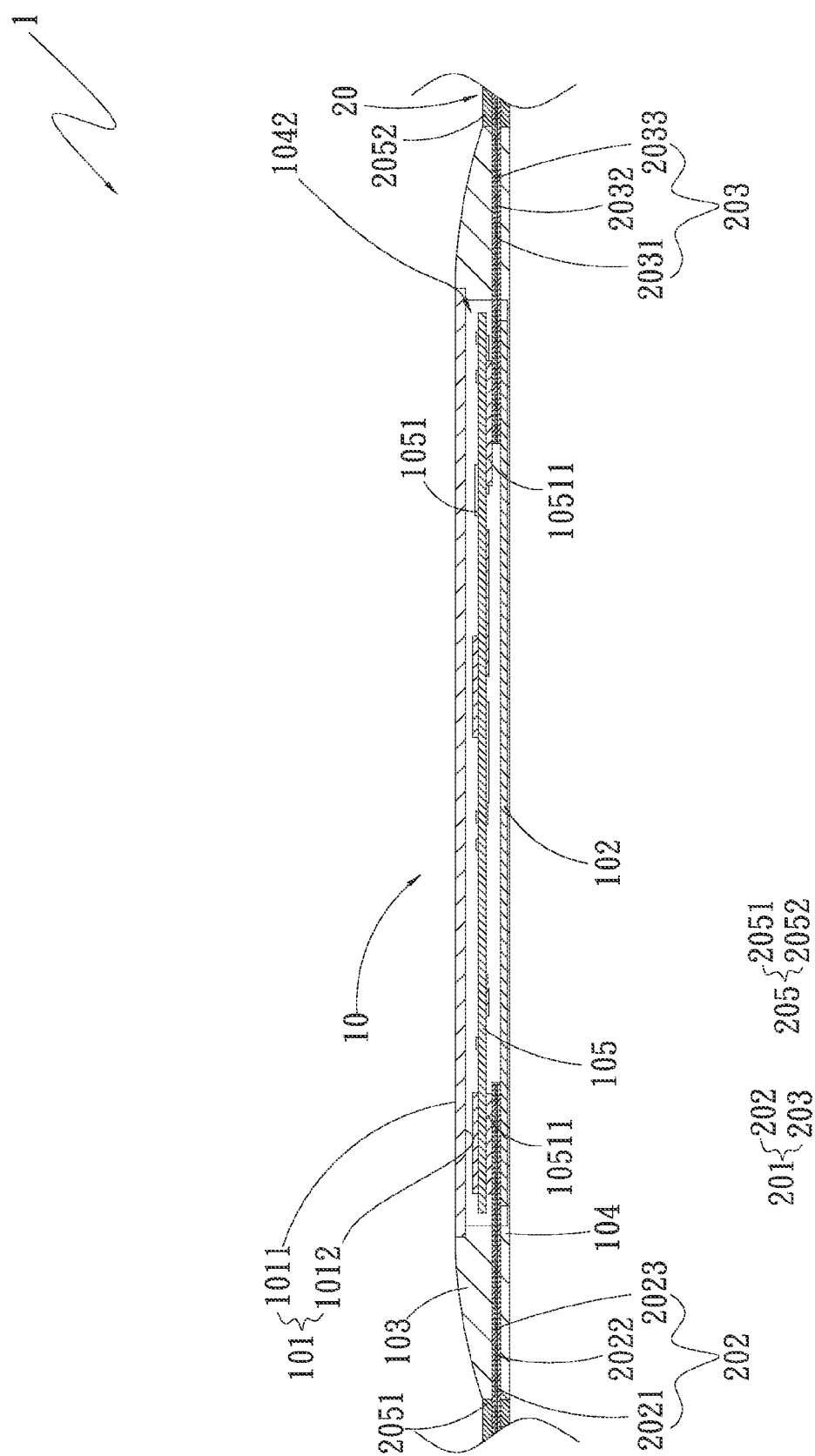
FIG. 14 is a sectional assembled view of the seventh embodiment of the present invention.

Please now refer to FIGS. 13 and 14. FIG. 13 is a perspective exploded view of a seventh embodiment of the present invention. FIG. 14 is a sectional assembled view of the seventh embodiment of the present invention. The seventh embodiment is substantially identical to the first embodiment in structure, connection relationship and effect and thus will not be repeatedly described. The seventh embodiment is mainly different from the first embodiment in that the wearable strap body 20 is changed from the above integrated elongated watchstrap into a two-piece elongated watchstrap. Also, the exposed section of the heat conduction section 201 of the wearable strap body 20 is attached to the heat sources 10511. That is, the heat conduction section 201 has a first heat conduction body 202 and a second heat conduction body 203. The protection section 205 has a first protection body 2051 and a second protection body 2052. The first and second protection bodies 2051, 2052 respectively enclose the first and second heat conduction bodies 202, 203. A section of the first and second heat conduction bodies 202, 203 is exposed to the interior of the receiving space 1042 and is not enclosed by the first and second protection bodies 2051, 2052. That is, the other section of the first and second heat conduction bodies 202, 203 is enclosed in the first and second protection bodies 2051, 2052. This section is positioned on two sides of the wearable main body 10 for a user to wear. One face of the exposed sections of the first and second heat conduction bodies 202, 203, (that is, a section of the first and second heat conduction bodies 202, 203) is positioned in the receiving space 1042 to respectively contact or attach to the heat sources 10511 (the CPU and the GPU). The exposed sections of the first and second heat conduction bodies 202, 203 absorb the heat generated by the heat sources 10511 and quickly conduct the heat to the other sections of the first and second heat conduction bodies 202, 203 to dissipate the heat outward.

Figure 15:
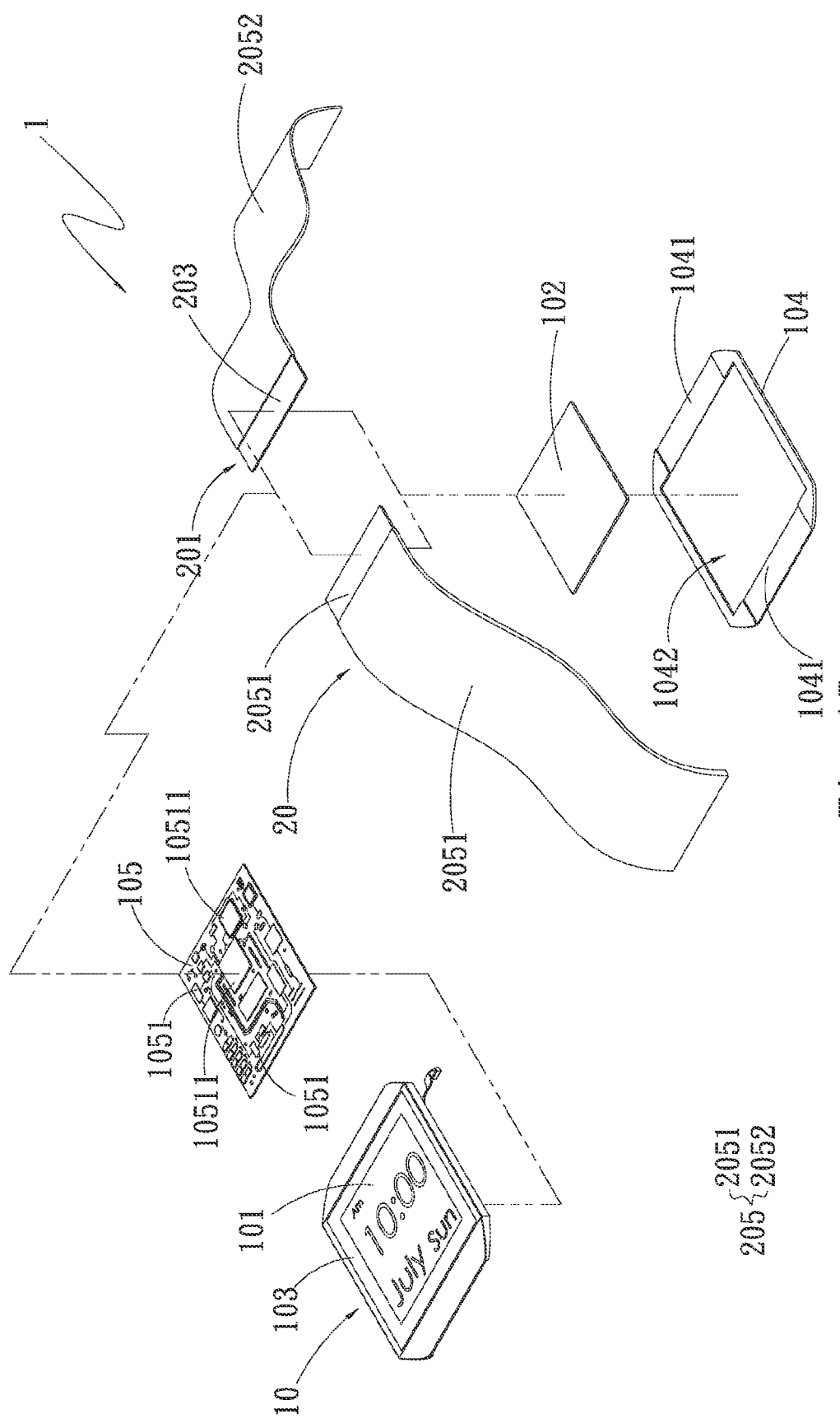
FIG. 15 is another perspective exploded view of the seventh embodiment of the present invention.
Figure 16:
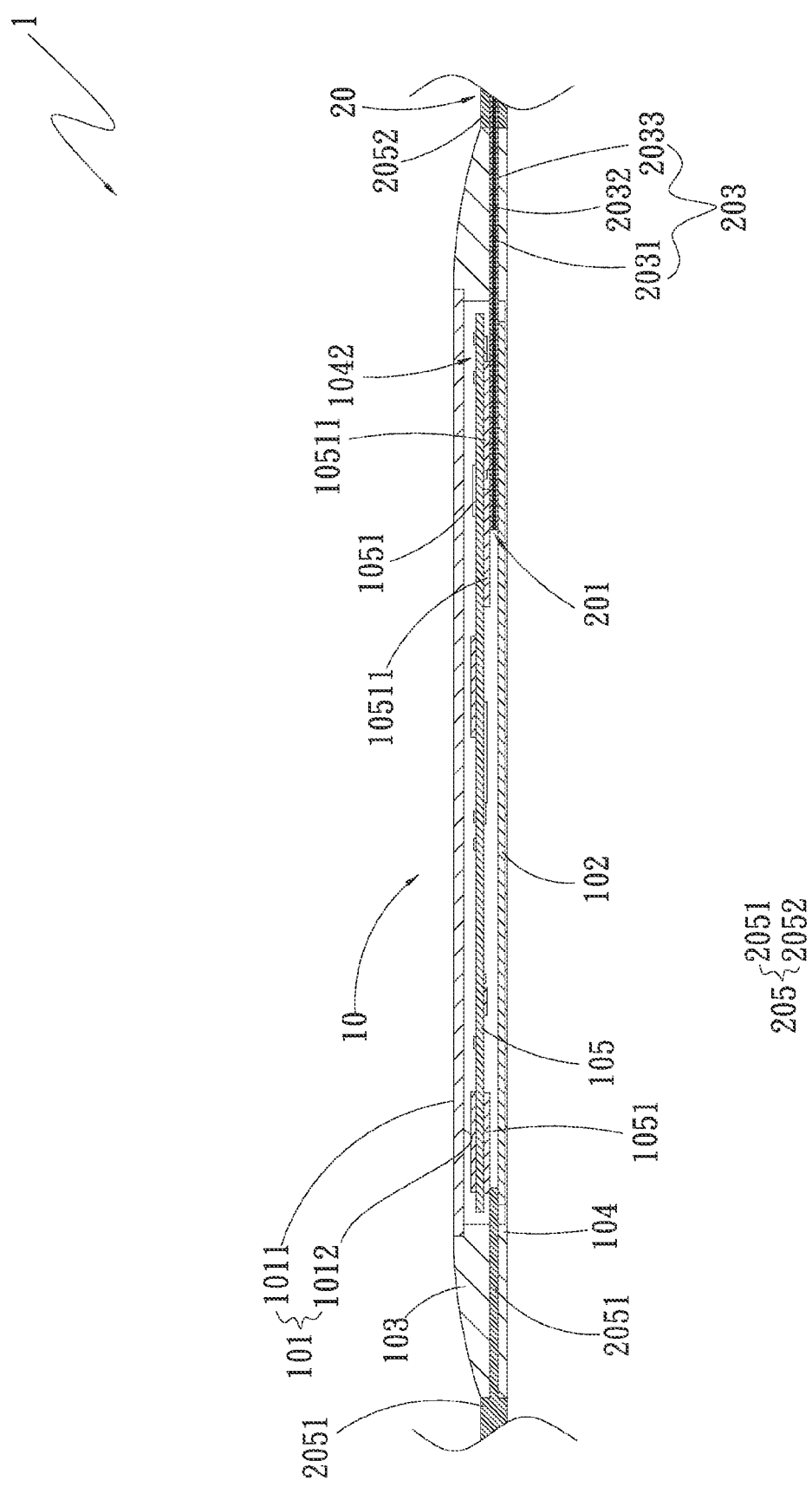
FIG. 16 is another sectional assembled view of the seventh embodiment of the present invention.

In practice, according to the arrangement positions of the heat sources 10511 on the circuit board 105, the two-piece elongated watchstrap can be such designed that one of the two pieces is provided with a heat conduction body, while the other piece is free from any heat conduction body. That is, a section of the first heat conduction body 202 or a section of the second heat conduction body 203 is in contact with the heat sources 10511, while the first heat conduction body 202 or the second heat conduction body 203 is not enclosed in the first protection body 2051 or the second protection body 2052 without contacting the heat sources 10511. As shown in FIGS. 15 and 16, the first heat conduction body 202 is not enclosed in the first protection body 2015. One end thereof is received in the recess 1041. The second heat conduction body 202 is enclosed in the second protection body 2052. One face of the exposed section of the second heat conduction body 203 is positioned in the receiving space 1042 to contact or attach to the heat sources 10511 (the CPU and the GPU). The other face of the exposed section of the second heat conduction body 203 is attached to the battery 102.

In this embodiment, the wearable strap body 20 is a two-piece elongated watchstrap for illustration. The rear sections of the watchstrap, (that is, the exposed sections of the first and second heat conduction bodies 202, 203) are received in the receiving space 1042 to directly absorb the heat and quickly conduct the heat to the front and middle sections of the wearable strap body 20 on two sides of the wearable main body 10. The first and second heat conduction bodies 202, 203 enclosed in the front and middle sections absorb the heat and dissipate the heat outward. Accordingly, the heat of the CPU and GPU of the wearable main body 10 will not accumulate in the wearable main body 10 and the CPU and GPU can stably and quickly operate. In addition, the user can wear the wearable main body more comfortably.

The exposed sections of the first and second heat conduction bodies 202, 203 of the heat conduction section 201 are respectively received in the recesses 1041 and protrude to the center of the receiving space 1042. Each of the first and second heat conduction bodies 202, 203 has a first heat conduction layer 2021, 2031, a second heat conduction layer 2022, 2032 and a third heat conduction layer 2023, 2033. The first and third heat conduction layers 2021, 2031, 2023, 2033 of the first and second heat conduction bodies 202, 203 are made of metal foils (such as gold foils, silver foils, copper foils or aluminum foils). In this embodiment, the first and third heat conduction layers 2021, 2031, 2023, 2033 of the first and second heat conduction bodies 202, 203 are made of copper foils for illustration. The second heat conduction layers 2022, 2032 of the first and second heat conduction bodies 202, 203 are made of graphite material. The first and second protection bodies 2051, 2052 are made of flexible plastic material.

The second heat conduction layer 2022 of the first heat conduction body 202 is sandwiched between the first and third heat conduction layers 2021, 2023 of the first heat conduction body 202. The second heat conduction layer 2032 of the second heat conduction body 203 is sandwiched between the first and third heat conduction layers 2031, 2033 of the second heat conduction body 203. The first and second protection bodies 2051, 2052 respectively encloses the outer faces of the first and third heat conduction layers 2021, 2031, 2023, 2033 of the other sections of the first and second heat conduction bodies 202, 203, (that is, the heat conduction section 201 enclosed in the front and middle sections of the wearable strap body 20). The outer faces of the first heat conduction layers 2021, 2031 of the exposed sections of the first and second heat conduction bodies 202, 203 in the receiving space 1042, (that is, the exposed heat conduction section 201 of the rear sections of the wearable strap body 20) are attached to the heat sources 10511 (the CPU and GPU), while the outer faces of the third heat conduction layers 2023, 2033 of the exposed sections of the first and second heat conduction bodies 202, 203 are attached to the battery 102. Accordingly, the first heat conduction layers 2021, 2031 of the first and second heat conduction bodies 202, 203 will absorb the heat generated by the CPU and the GPU and quickly conduct the heat to the second and third heat conduction layers 2022, 2023, 2032, 2033 of the first and second heat conduction bodies 202, 203. At the same time, the third heat conduction layers 2023, 2033 will absorb the heat of the battery 102. The heat is then transferred to the other sections of the first and second heat conduction bodies 202, 203, (that is, the front and middle sections of the wearable strap body 20 on two sides of the wearable main body 10) and dissipated outward. Accordingly, the heat of the wearable main body 10 is quickly dissipated.

Therefore, the first and second heat conduction bodies 202, 203 are enclosed in the wearable strap body 20. A part of the first and second heat conduction bodies 202, 203 is exposed to attach to the heat sources 10511 of the wearable main body 10, whereby the heat dissipation performance of the wearable electronic device is greatly enhanced. Accordingly, the heat will not accumulate in the wearable main body 10 and a user can wear the wearable main body 10 more comfortably.

Figure 17:
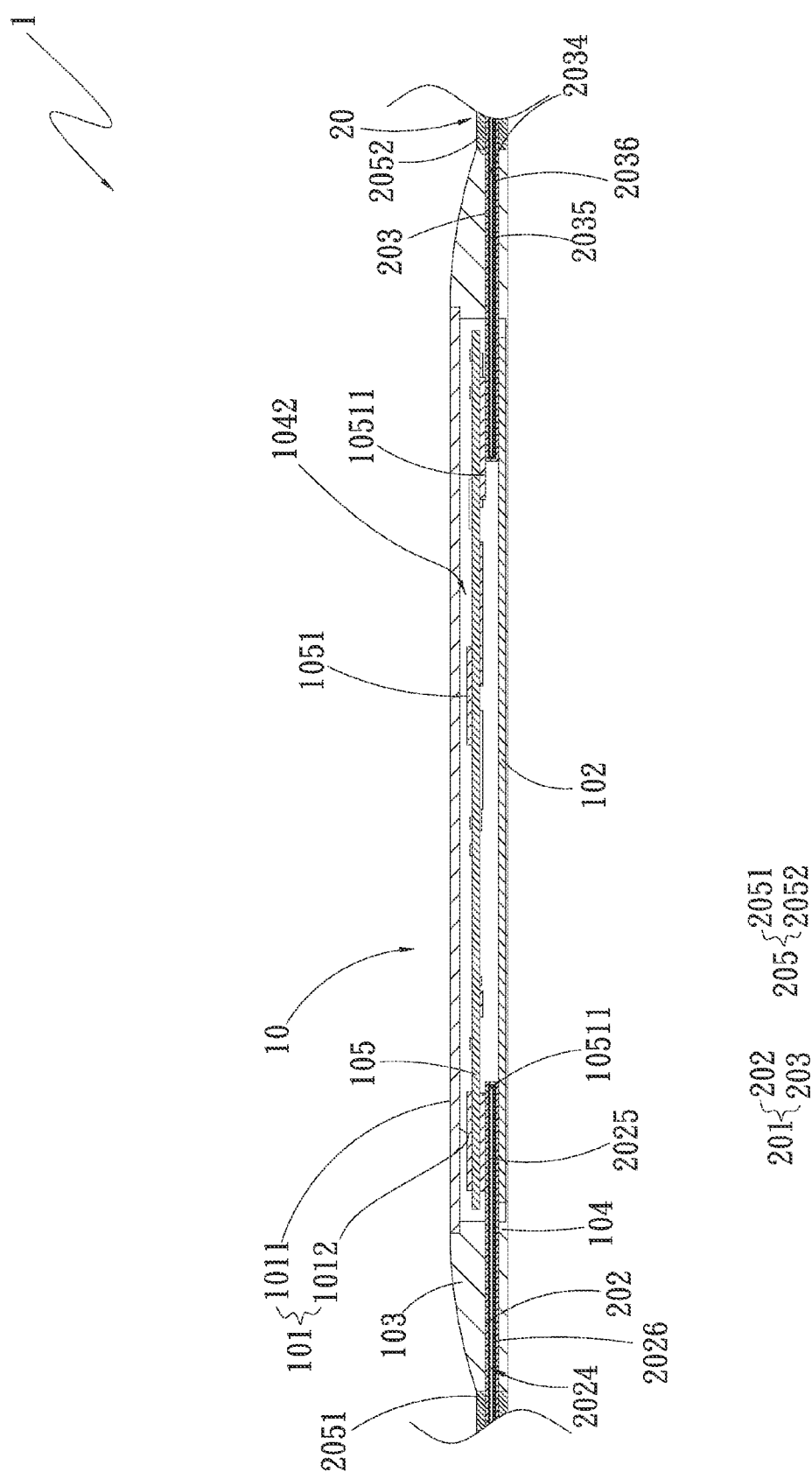
FIG. 17 is a sectional assembled view of an eighth embodiment of the present invention.

Please now refer to FIG. 17, which is a sectional assembled view of an eighth embodiment of the present invention. Also referring to FIG. 13, the eighth embodiment is substantially identical to the seventh embodiment in structure, connection relationship and effect and thus will not be repeatedly described. The eighth embodiment is mainly different from the seventh embodiment in that the heat conduction section 201 is a flexible heat pipe. That is, the first and second heat conduction bodies 202, 203 are flexible heat pipes made of flexible metal material (such as copper material). Each of the first and second heat conduction bodies 202, 203 has a chamber 2024, 2034 and a capillary structure 2025, 2035. A working fluid 2026, 2036 is filled in the chamber 2024, 2034 of each of the first and second heat conduction bodies 202, 203. The working fluid 2026, 2036 is selected from a group consisting of pure water, inorganic compound, alcohol group, ketone group, liquid metal, coolant and organic compound. The capillary structure 2025, 2035 of each of the first and second heat conduction bodies 202, 203 is formed on inner wall face of the chamber 2024, 2034. The other face of the exposed sections of the first and second heat conduction bodies 202, 203 in the receiving space 1042 is attached to the battery 102. One face of the exposed sections of the first and second heat conduction bodies 202, 203, (that is, one face of the flexible heat pipe) is attached to the heat sources 10511 (the CPU and the GPU). The first and second protection bodies 2051, 2052 are made of flexible plastic material or hard plastic material. In this embodiment, the first and second protection bodies 2051, 2052 are made of flexible plastic material for illustration.

Figure 18:
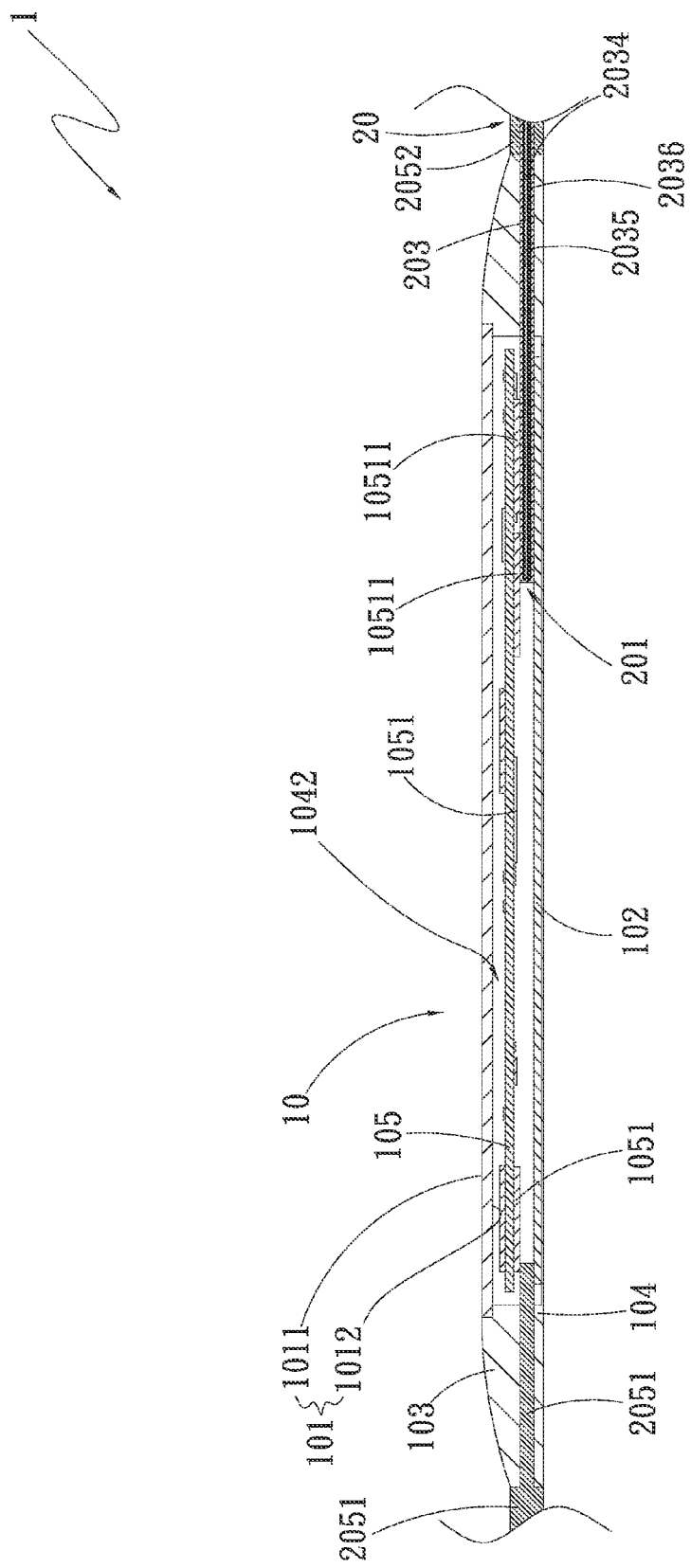
FIG. 18 is another sectional assembled view of the eighth embodiment of the present invention.

In practice, according to the arrangement positions of the heat sources 10511 on the circuit board 105, the two-piece elongated watchstrap can be such designed that one of the two pieces is provided with a heat conduction body, while the other piece is free from any heat conduction body. That is, a section of the first heat conduction body 202 (the first flexible heat pipe) or a section of the second heat conduction body 203 (the second flexible heat pipe) is in contact with the heat sources 10511, while the first heat conduction body 202 or the second heat conduction body 203 is not enclosed in the first protection body 2051 or the second protection body 2052 without contacting the heat sources 10511. As shown in FIGS. 18 and 15, the first heat conduction body 202 (the first flexible heat pipe) is not enclosed in the first protection body 2015. One end thereof is received in the recess 1041. The second heat conduction body 202 (the second flexible heat pipe) is enclosed in the second protection body 2052. One face of the exposed section of the second heat conduction body 203 in the receiving space 1042 contacts or attaches to the heat sources 10511 (the CPU and the GPU). The other face of the exposed section of the second heat conduction body 203 attaches to the battery 102.

Therefore, the first and second heat conduction bodies 202, 203 enclosed in the wearable strap body 20 are flexible heat pipes. A part of the first and second heat conduction bodies 202, 203 is exposed to attach to the heat sources 10511 of the wearable main body 10, whereby the heat dissipation performance of the wearable electronic device is greatly enhanced. Accordingly, the heat will not accumulate in the wearable main body 10 and a user can wear the wearable main body 10 more comfortably.

Figure 19:
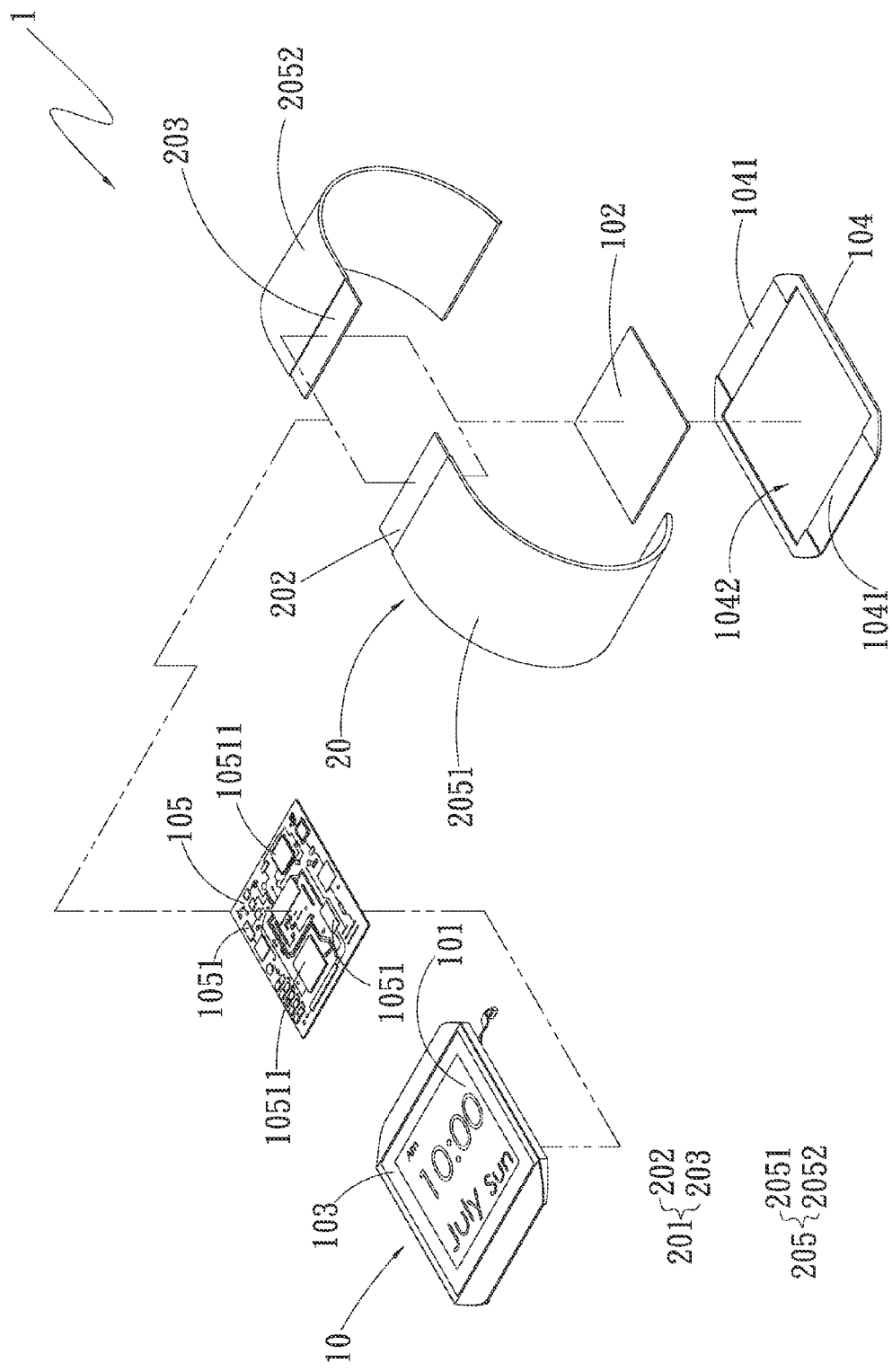
FIG. 19 is a perspective exploded view of a ninth embodiment of the present invention.

Please now refer to FIG. 19, which is a perspective exploded view of a ninth embodiment of the present invention. Also referring to FIG. 17, the ninth embodiment is substantially identical to the seventh embodiment in structure, connection relationship and effect and thus will not be repeatedly described. The ninth embodiment is different from the seventh embodiment in that the first and second heat conduction bodies 202, 203 are heat pipes made of hard metal material and the first and second protection bodies 2051, 2052 are made of hard plastic material. Therefore, the front and middle sections of the wearable strap body 20, (that is, the other section of the first heat conduction body 202 enclosed in the first protection body 2051 and the other section of the second heat conduction body 203 enclosed in the second protection body 2052) are respectively inward bent toward the center of the lower frame body 104 and secured to form a fitting opening 208. A user can directly wear the wearable main body through the fitting opening 208.

In practice, according to the arrangement positions of the heat sources 10511 on the circuit board 105, the two-piece elongated watchstrap can be such designed that one of the two pieces is provided with a heat conduction body, while the other piece is free from any heat conduction body. That is, a section of the first heat conduction body 202 (the first heat pipe) or a section of the second heat conduction body 203 (the second heat pipe) is in contact with the heat sources 10511, while the first heat conduction body 202 or the second heat conduction body 203 is not enclosed in the first protection body 2051 or the second protection body 2052 without contacting the heat sources 10511. As shown in FIGS. 20 and 18, the first heat conduction body 202 (the first heat pipe) is not enclosed in the first protection body 2015. One end thereof is received in the recess 1041. The second heat conduction body 202 (the second heat pipe) is enclosed in the second protection body 2052. One face of the exposed section of the second heat conduction body 203 in the receiving space 1042 contacts or attaches to the heat sources

10511 (the CPU and the GPU). The other face of the exposed section of the second heat conduction body 203 attaches to the battery 102.

Therefore, the first and second heat conduction bodies 202, 203 enclosed in the wearable strap body 20 are heat pipes. A part of the first and second heat conduction bodies 202, 203 is exposed to attach to the heat sources 10511 of the wearable main body 10, whereby the heat dissipation performance of the wearable electronic device is greatly enhanced. Accordingly, the heat will not accumulate in the wearable main body 10 and a user can wear the wearable main body 10 more comfortably.

According to the above, in comparison with the conventional device, the present invention has the following advantages:

1. The heat dissipation performance of the wearable electronic device is greatly enhanced and the heat will not accumulate in the wearable main body.
2. A user can wear the wearable main body more comfortably.

The present invention has been described with the above embodiments thereof and it is understood that many changes and modifications in the above embodiments can be carried out without departing from the scope and the spirit of the invention that is intended to be limited only by the appended claims.

What is claimed is:

1. A heat dissipation structure of wearable electronic device comprising:
    a wearable main body including a receiving space, a circuit board and multiple electronic components, the electronic components being arranged on the circuit board, the circuit board with the electronic components being received in the receiving space, at least one of the electronic components being a heat source; and
    a wearable strap body connected with the wearable main body, the wearable strap body having a heat conduction section and a protection section, the protection section enclosing the heat conduction section, a section of the heat conduction section being exposed to an interior of the receiving space without being enclosed by the protection section;
    wherein the heat conduction section has a first heat conduction layer, a second heat conduction layer and a third heat conduction layer, the whole second heat conduction layer being sandwiched between the first and third heat conduction layers, an outer face of the first heat conduction layer of the exposed section of the heat conduction section in the receiving space being attached to the heat source; and
    wherein the first and third heat conduction layers are made of metal foils and the second heat conduction layer is made of graphite material, the protection section being made of flexible plastic material.

2. The heat dissipation structure of wearable electronic device as claimed in claim 1, wherein the wearable main body includes a touch display module, a battery, an upper frame body and a lower frame body, the upper frame body being mated with the lower frame body to cover the lower frame body, the upper frame body receiving the touch display module therein, the touch display module having a touch display face and a bottom face, the bottom face facing the circuit board, the lower frame body being formed with the receiving space and multiple recesses, a central section of one face of the lower frame body being recessed to form the receiving space, the recesses being formed on two opposite sides of one face of the lower frame body in adjacency to and in communication with the receiving space, the exposed section of the heat conduction section being bridged over the receiving space to extend from one recess of the lower frame body into the other opposite recess of the lower frame body, the battery being positioned on a bottom of the receiving space.

3. The heat dissipation structure of wearable electronic device as claimed in claim 1, wherein the heat conduction section is made of graphite, metal foil or a combination thereof.

4. A heat dissipation structure of wearable electronic device comprising:
    a wearable main body including a receiving space, a circuit board and multiple electronic components, the electronic components being arranged on the circuit board, the circuit board with the electronic components being received in the receiving space, at least one of the electronic components being a heat source;
    a wearable strap body connected with the wearable main body, the wearable strap body having a heat conduction section and a protection section, the protection section enclosing the heat conduction section, a section of the heat conduction section being exposed to an interior of the receiving space without being enclosed by the protection section; and
    wherein the heat conduction section is a heat pipe made of flexible metal material, the heat conduction section having a chamber and a capillary structure, a working fluid being filled in the chamber, the capillary structure being formed on inner wall face of the chamber, one face of the exposed section of the heat conduction section in the receiving space being attached to the heat source, the protection section being made of flexible plastic material or hard plastic material.

5. The heat dissipation structure of wearable electronic device as claimed in claim 4, wherein the wearable main body includes a touch display module, a battery, an upper frame body and a lower frame body, the upper frame body being mated with the lower frame body to cover the lower frame body, the upper frame body receiving the touch display module therein, the touch display module having a touch display face and a bottom face, the bottom face facing the circuit board, the lower frame body being formed with the receiving space and multiple recesses, a central section of one face of the lower frame body being recessed to form the receiving space, the recesses being formed on two opposite sides of one face of the lower frame body in adjacency to and in communication with the receiving space, the exposed section of the heat conduction section being bridged over the receiving space to extend from one recess of the lower frame body into the other opposite recess of the lower frame body, the battery being positioned on a bottom of the receiving space.

6. A heat dissipation structure of wearable electronic device comprising:
    a wearable main body including a receiving space, a circuit board and multiple electronic components, the electronic components being arranged on the circuit board, the circuit board with the electronic components being received in the receiving space, at least one of the electronic components being a heat source;
    a wearable strap body connected with the wearable main body, the wearable strap body having a heat conduction section and a protection section, the protection section enclosing the heat conduction section, a section of the heat conduction section being exposed to an interior of the receiving space without being enclosed by the protection section; and wherein the heat conduction section is a heat pipe made of hard metal material, the heat conduction section having a chamber and a capillary structure, a working fluid being filled in the chamber, the capillary structure being formed on inner wall face of the chamber, one face of the exposed section of the heat conduction section in the receiving space being attached to the heat source, the protection section being made of hard plastic material.

7. The heat dissipation structure of wearable electronic device as claimed in claim 6, wherein the wearable main body includes a touch display module, a battery, an upper frame body and a lower frame body, the upper frame body being mated with the lower frame body to cover the lower frame body, the upper frame body receiving the touch display module therein, the touch display module having a touch display face and a bottom face, the bottom face facing the circuit board, the lower frame body being formed with the receiving space and multiple recesses, a central section of one face of the lower frame body being recessed to form the receiving space, the recesses being formed on two opposite sides of one face of the lower frame body in adjacency to and in communication with the receiving space, the exposed section of the heat conduction section being bridged over the receiving space to extend from one recess of the lower frame body into the other opposite recess of the lower frame body, the battery being positioned on a bottom of the receiving space.

8. A heat dissipation structure of wearable electronic device comprising:
a wearable main body including a receiving space, a circuit board and multiple electronic components, the electronic components being arranged on the circuit board, the circuit board with the electronic components being received in the receiving space, at least one of the electronic components being a heat source;
a wearable strap body connected with the wearable main body, the wearable strap body having a heat conduction section and a protection section, the protection section enclosing the heat conduction section, a section of the heat conduction section being exposed to an interior of the receiving space without being enclosed by the protection section, the exposed section of the heat conduction section being indirectly in contact with the corresponding heat source;
wherein the heat conduction section has a first heat conduction body and a second heat conduction body and the protection section has a first protection body and a second protection body, the first and second protection bodies respectively enclosing the first and second heat conduction bodies, a section of the first and second heat conduction bodies being exposed to an interior of the receiving space without being enclosed by the first and second protection bodies, the exposed sections of the first and second heat conduction bodies being opposite to each other, the battery in the receiving space being positioned under the exposed sections of the first and second heat conduction bodies; and
wherein the wearable main body further includes a conduction section received in the receiving space and positioned on upper side of the first and second heat conduction bodies, two opposite sides of one face of the conduction section respectively contacting one face of the corresponding exposed sections of the first and second heat conduction bodies, the other face of the conduction section being attached to the heat source on the circuit board.

9. The heat dissipation structure of wearable electronic device as claimed in claim 8, wherein each of the first and second heat conduction bodies has a first heat conduction layer, a second heat conduction layer and a third heat conduction layer, the second heat conduction layer of the first heat conduction body being sandwiched between the first and third heat conduction layers of the first heat conduction body, the second heat conduction layer of the second heat conduction body being sandwiched between the first and third heat conduction layers of the second heat conduction body.

10. The heat dissipation structure of wearable electronic device as claimed in claim 9, wherein the first and third heat conduction layers of the first and second heat conduction bodies are made of metal foils and the second heat conduction layers of the first and second heat conduction bodies are made of graphite material, the first and second protection bodies being made of flexible plastic material.

11. The heat dissipation structure of wearable electronic device as claimed in claim 8, wherein the heat conduction section is a vapor chamber, the heat conduction section having a chamber, a capillary structure and multiple support columns, a working fluid being filled in the chamber, the capillary structure being formed on inner wall face of the chamber, the support columns being received in the chamber, top ends and bottom ends of the support columns respectively abutting against upper and lower walls of the chamber.

12. The heat dissipation structure of wearable electronic device as claimed in claim 8, wherein the first and second heat conduction bodies are heat pipes made of flexible metal material, each of the first and second heat conduction bodies having a chamber and a capillary structure, a working fluid being filled in the chamber of each of the first and second heat conduction bodies, the capillary structure being formed on inner wall face of the chamber of each of the first and second heat conduction bodies, the first and second protection bodies being made of flexible plastic material or hard plastic material.

13. The heat dissipation structure of wearable electronic device as claimed in claim 8, wherein the first and second heat conduction bodies are heat pipes made of hard metal material, each of the first and second heat conduction bodies having a chamber and a capillary structure, a working fluid being filled in the chamber of each of the first and second heat conduction bodies, the capillary structure being formed on inner wall face of the chamber of each of the first and second heat conduction bodies, the first and second protection bodies being made of hard plastic material.

14. The heat dissipation structure of wearable electronic device as claimed in claim 8, wherein the wearable main body includes a touch display module, a battery, an upper frame body and a lower frame body, the upper frame body being mated with the lower frame body to cover the lower frame body, the upper frame body receiving the touch display module therein, the touch display module having a touch display face and a bottom face, the bottom face facing the circuit board, the lower frame body being formed with the receiving space and multiple recesses, a central section of one face of the lower frame body being recessed to form the receiving space, the recesses being formed on two opposite sides of one face of the lower frame body in adjacency to and in communication with the receiving space, the exposed sections of the first and second heat conduction bodies being respectively received in the recesses and protruding to the center of the receiving space, the battery being positioned on a bottom of the receiving space.

15. A heat dissipation structure of wearable electronic device comprising:
a wearable main body including a receiving space, a circuit board and multiple electronic components, the electronic components being arranged on the circuit board, the circuit board with the electronic components being received in the receiving space, at least one of the electronic components being a heat source;
a wearable strap body connected with the wearable main body, the wearable strap body having a heat conduction section and a protection section, the protection section enclosing the heat conduction section, a section of the heat conduction section being exposed to an interior of the receiving space without being enclosed by the protection section;
wherein the heat conduction section has a first heat conduction body and a second heat conduction body and the protection section has a first protection body and a second protection body, each of the first and second heat conduction bodies having a first heat conduction layer, a second heat conduction layer and a third heat conduction layer, the second heat conduction layer of the first heat conduction body being sandwiched between the first and third heat conduction layers of the first conduction body, the second heat conduction layer of the second heat conduction body being sandwiched between the first and third heat conduction layers of the second heat conduction body, the first and second protection bodies respectively enclosing the first and second heat conduction bodies, a section of the first and second heat conduction bodies being exposed to an interior of the receiving space without being enclosed by the first and second protection bodies, one face of the first heat conduction layer of the exposed sections of the first and second heat conduction bodies being attached to the heat source; and
wherein the first and third heat conduction layers of the first and second heat conduction bodies are made of metal foils and the second heat conduction layers of the first and second heat conduction bodies are made of graphite material, the first and second protection bodies being made of flexible plastic material.

16. The heat dissipation structure of wearable electronic device as claimed in claim 15, wherein the wearable main body includes a touch display module, a battery, an upper frame body and a lower frame body, the upper frame body being mated with the lower frame body to cover the lower frame body, the upper frame body receiving the touch display module therein, the touch display module having a touch display face and a bottom face, the bottom face facing the circuit board, the lower frame body being formed with the receiving space and multiple recesses, a central section of one face of the lower frame body being recessed to form the receiving space, the recesses being formed on two opposite sides of one face of the lower frame body in adjacency to and in communication with the receiving space, the exposed sections of the first and second heat conduction bodies being respectively received in the recesses and protruding to the center of the receiving space, the battery being positioned on a bottom of the receiving space.

* * * * *